Figure 14:
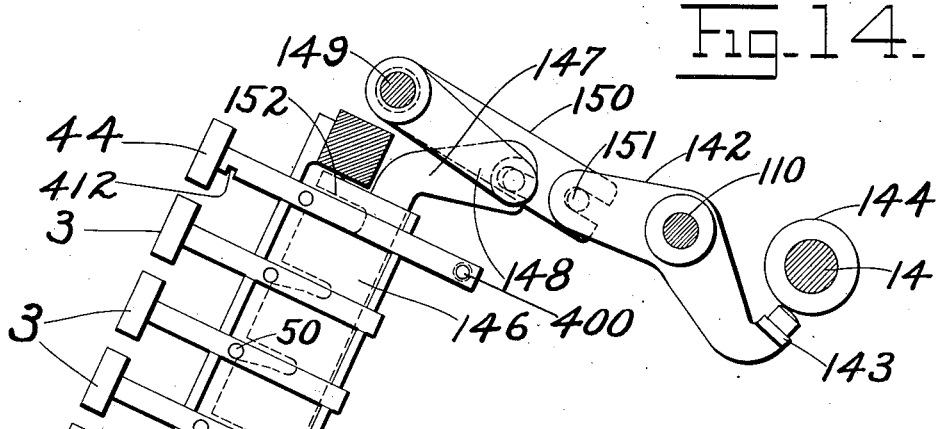

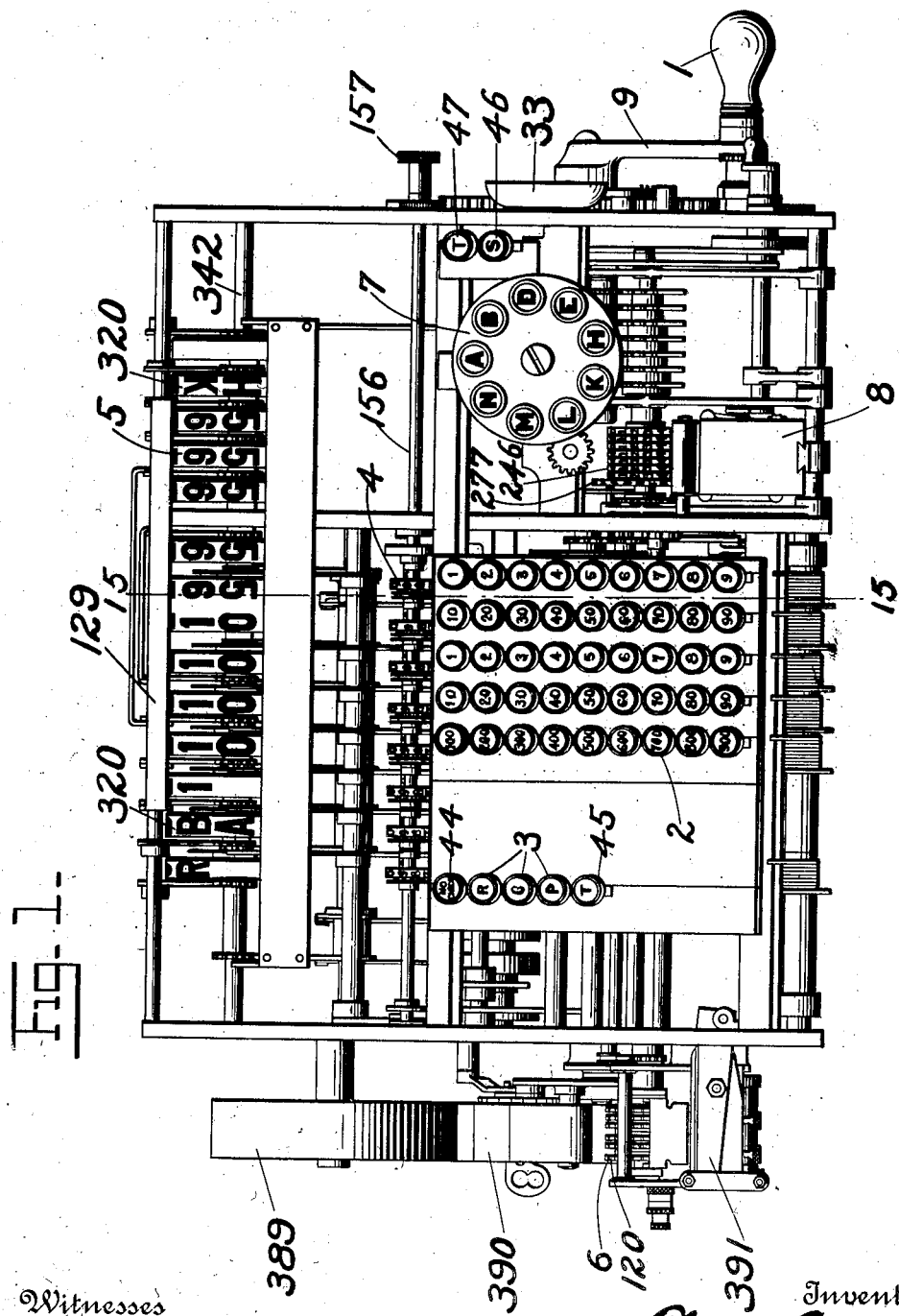

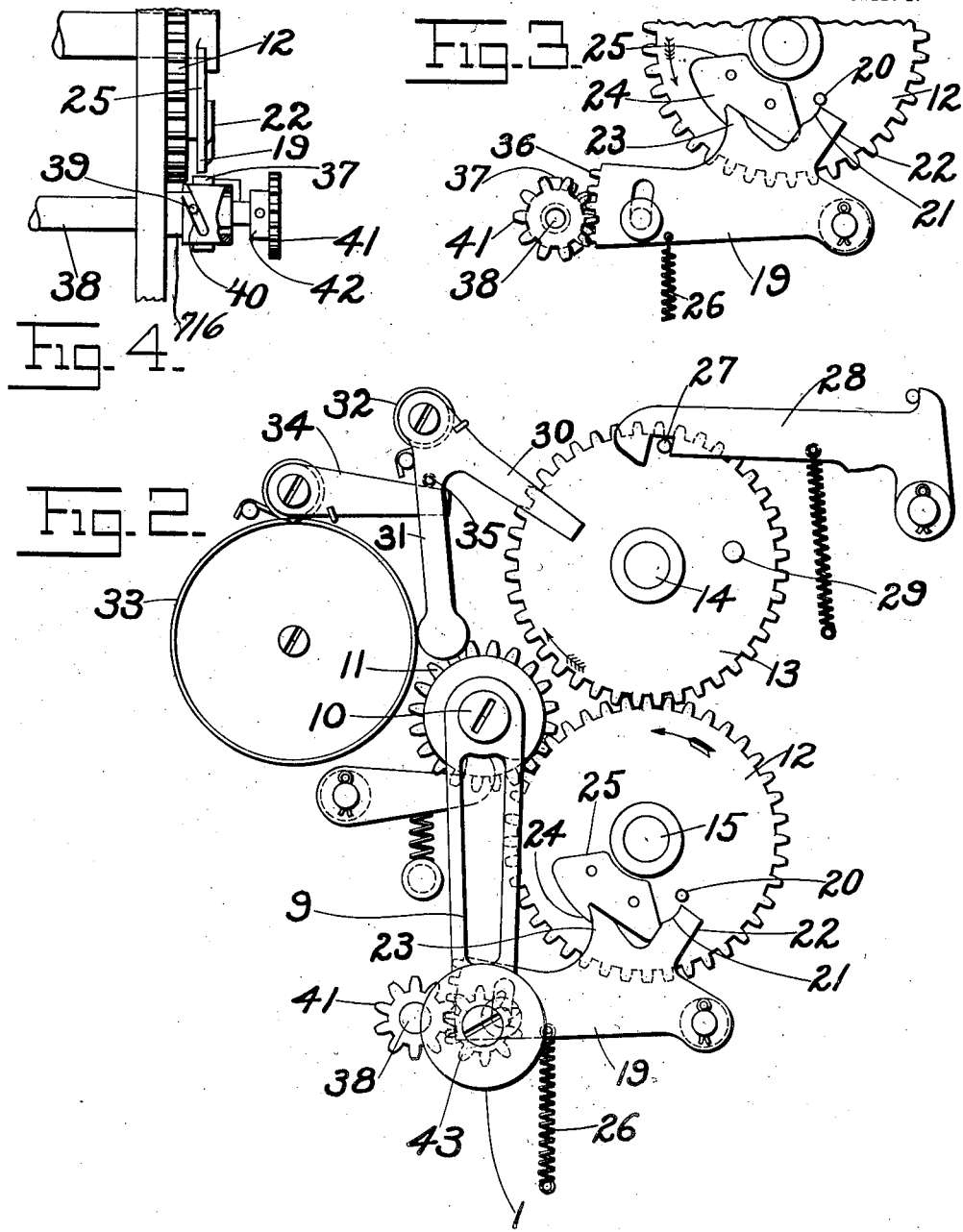

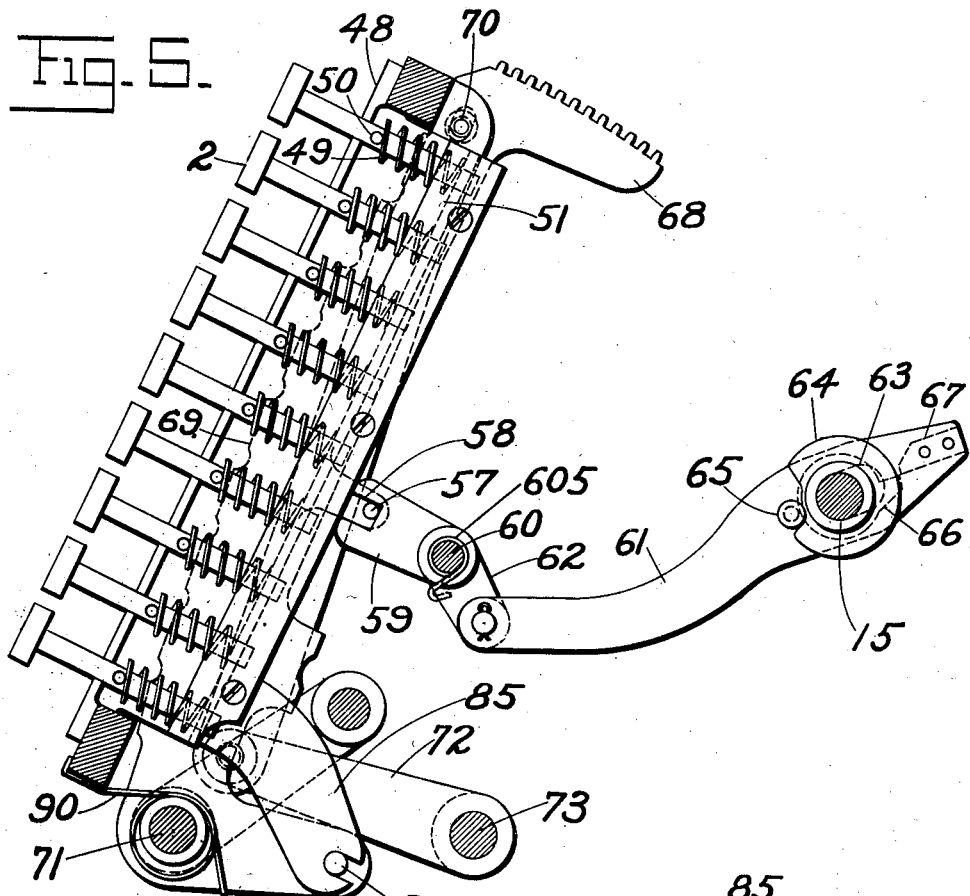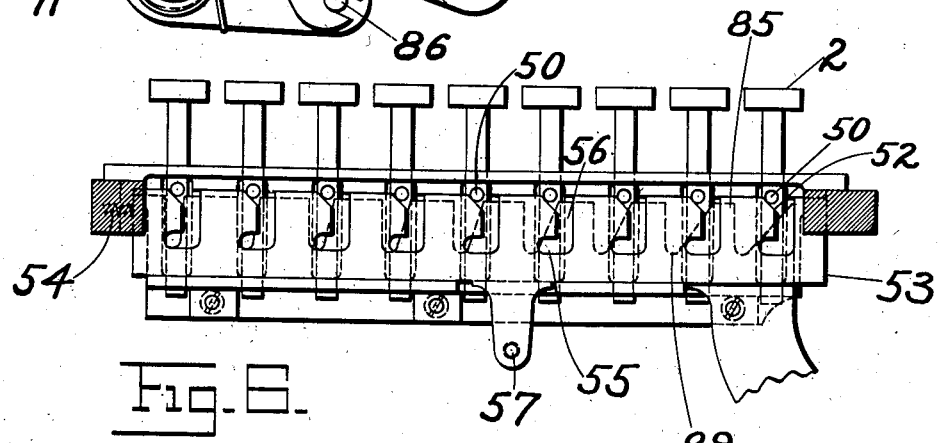

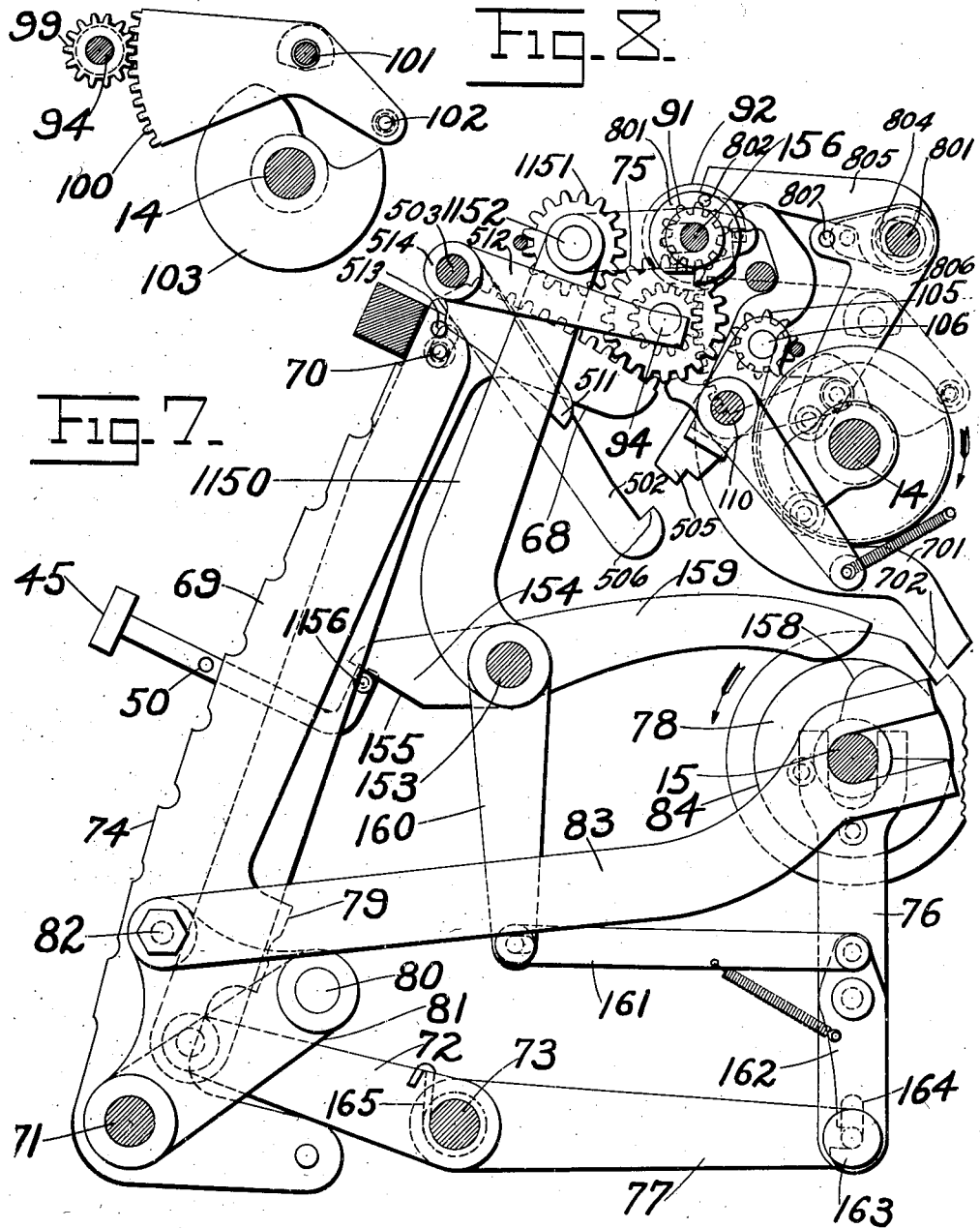

T. CARROLL.
MULTIPLE CASH REGISTER.
APPLICATION FILED MAY 27, 1910.
1,150,997.
Patented Aug. 24, 1915.
20 SHEETS—SHEET 5.
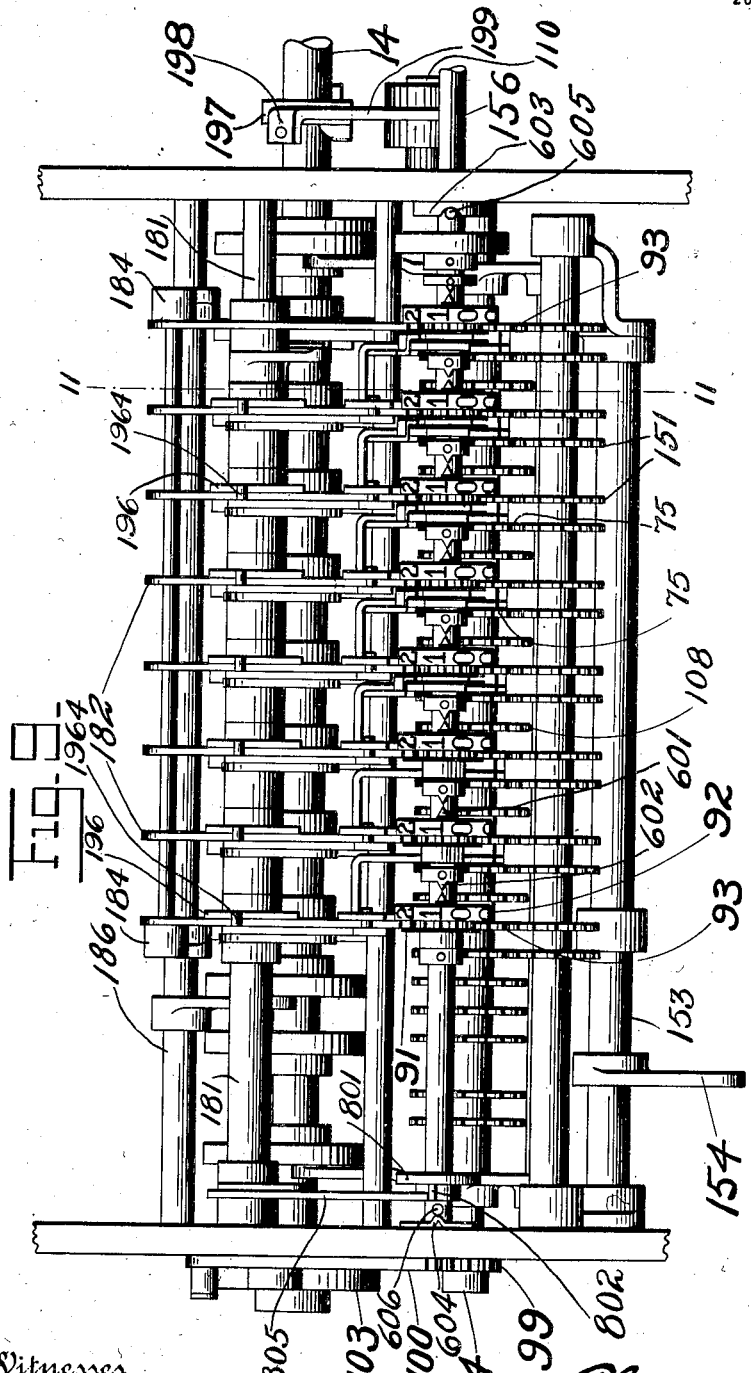

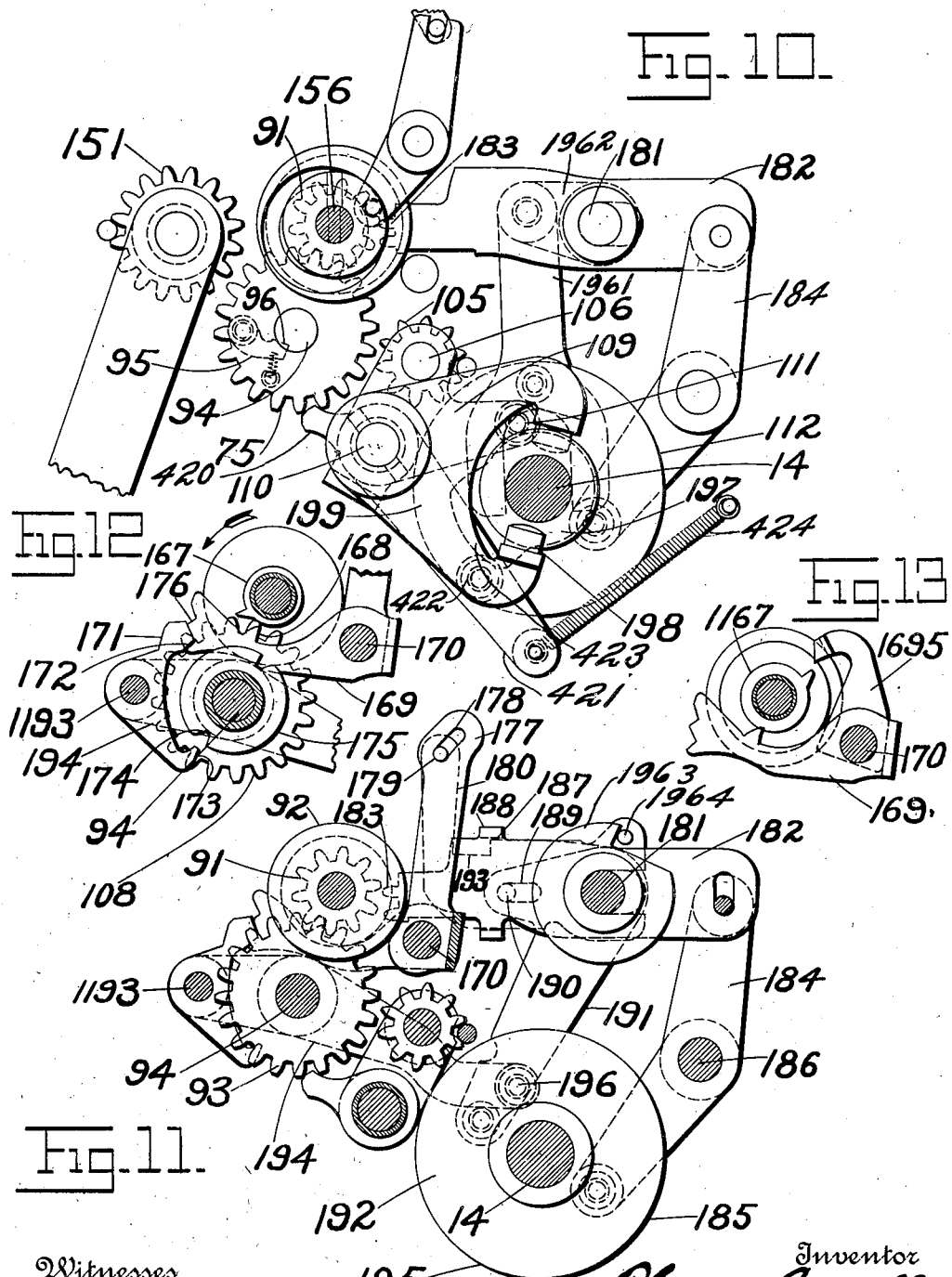

T. CARROLL.
MULTIPLE CASH REGISTER.
APPLICATION FILED MAY 27, 1910.

1,150,997.

Patented Aug. 24, 1915.
20 SHEETS—SHEET 7.

Witnesses
Inventor
Thomas Carroll
Attorneys

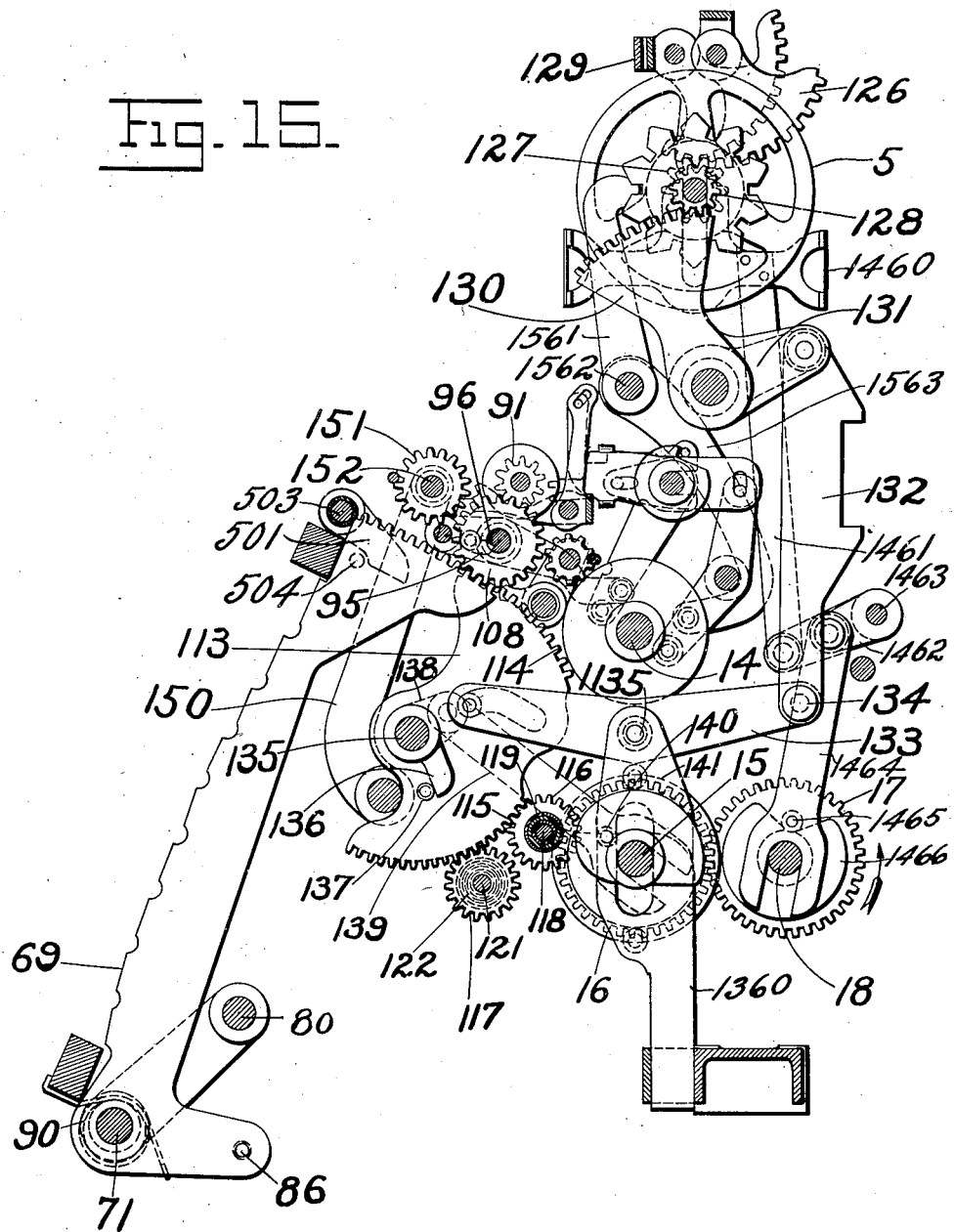

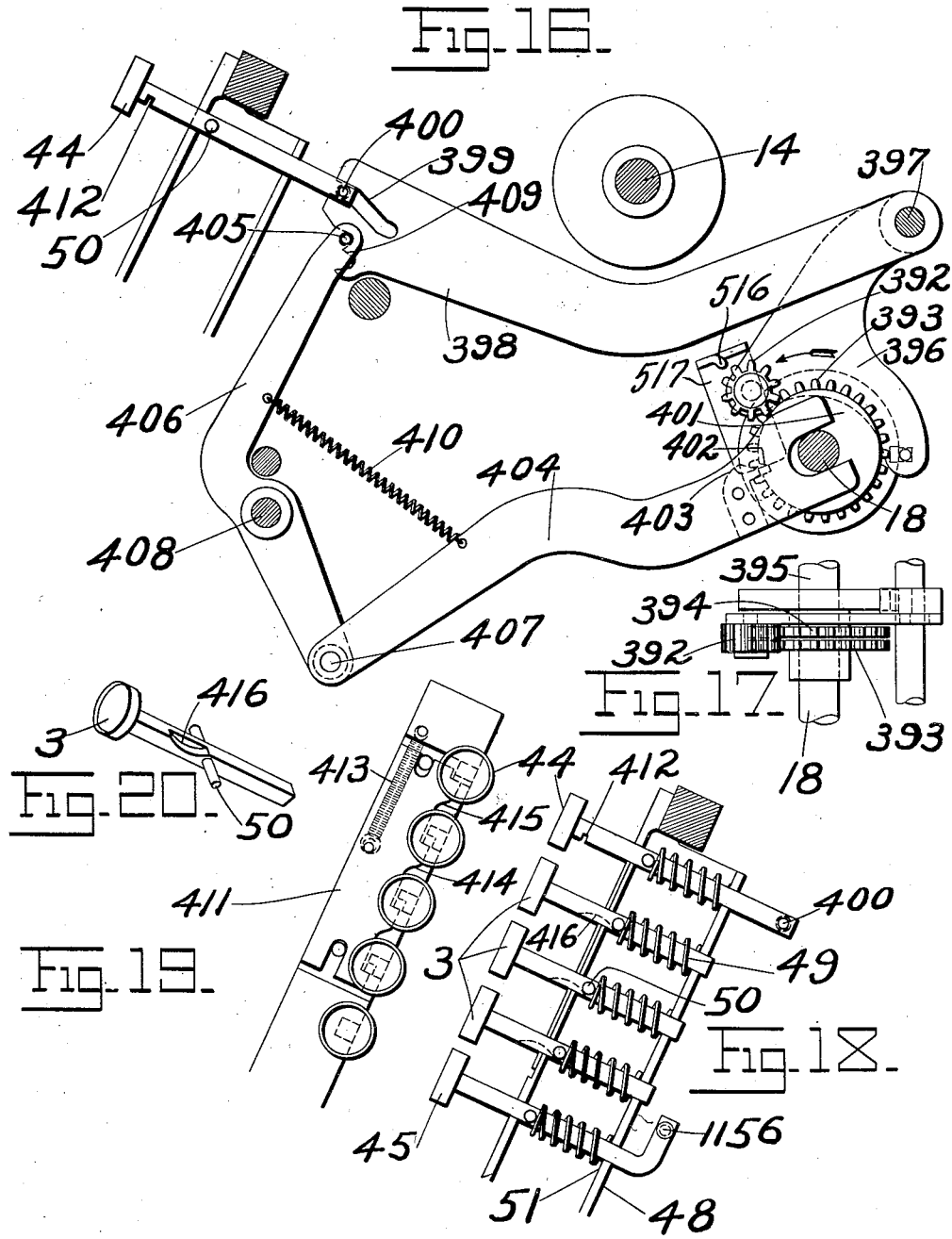

T. CARROLL.
MULTIPLE CASH REGISTER.
APPLICATION FILED MAY 27, 1910.
1,150,997.
Patented Aug. 24, 1915.
20 SHEETS—SHEET 10.
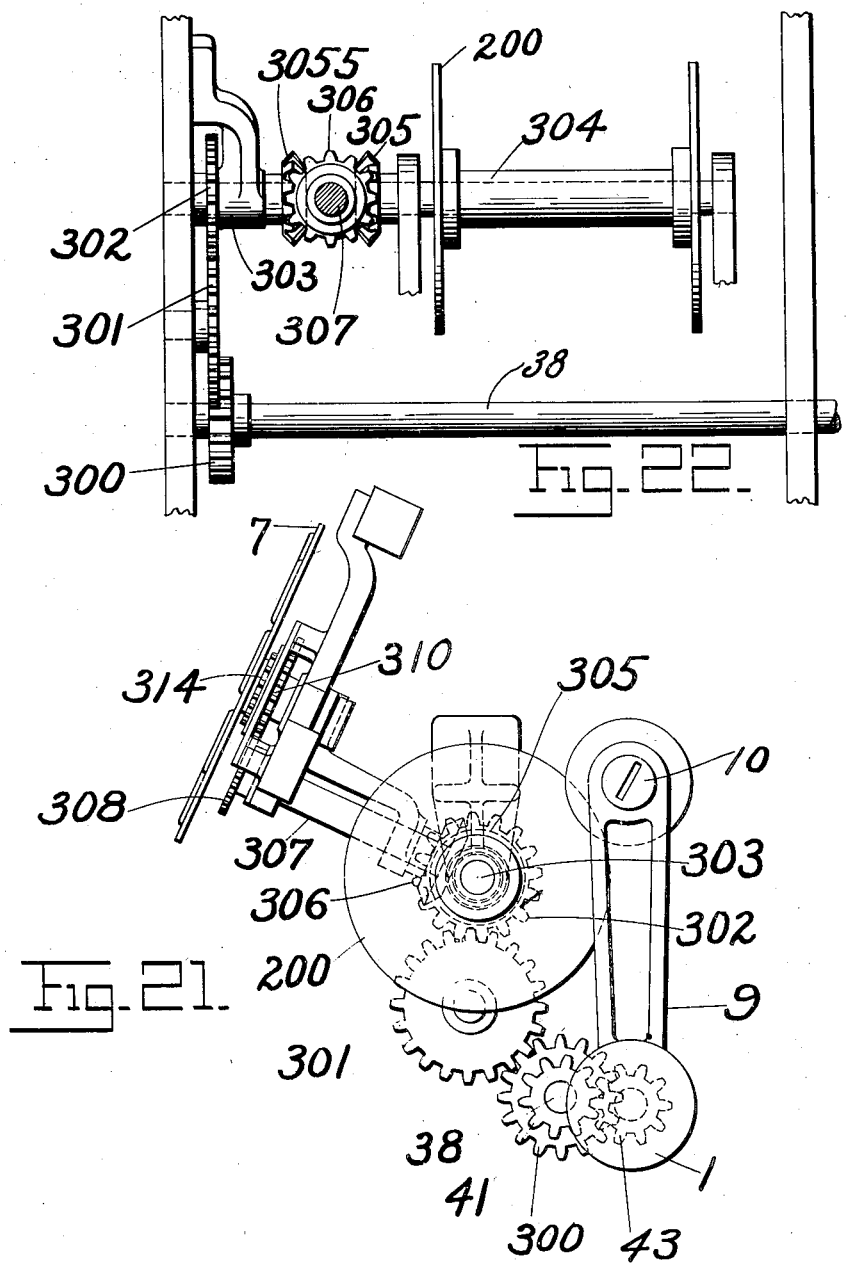

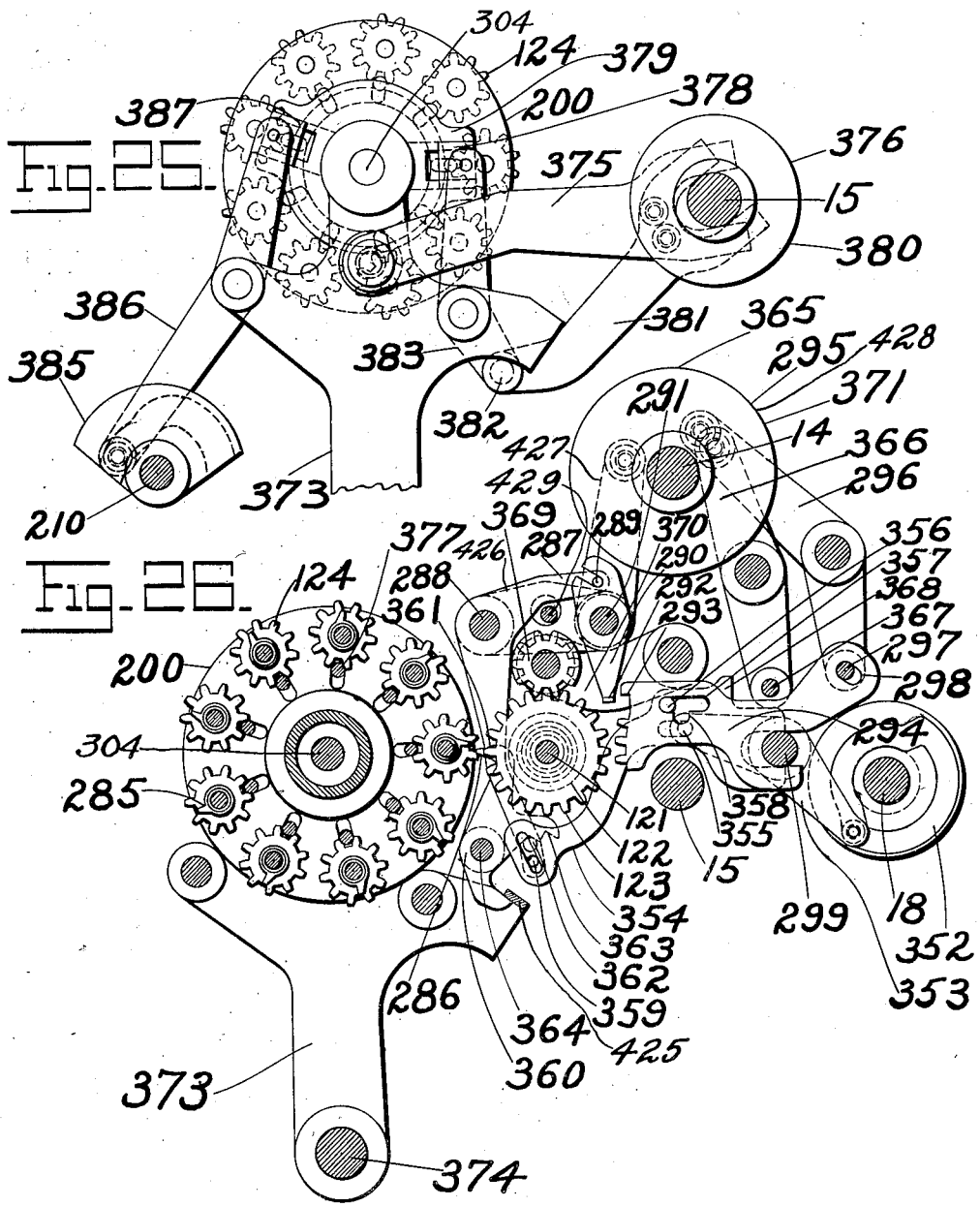

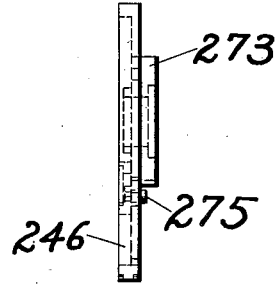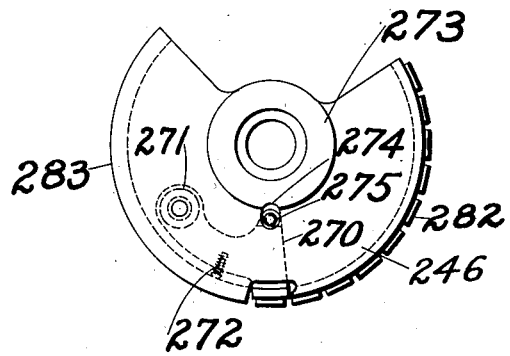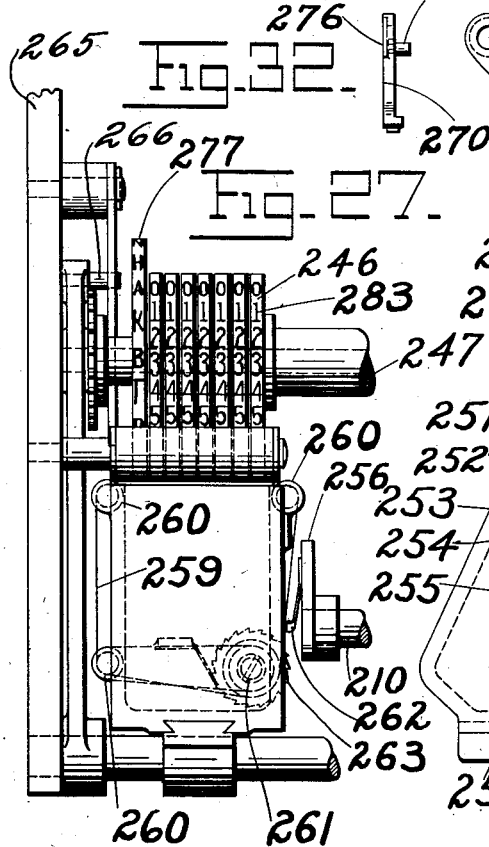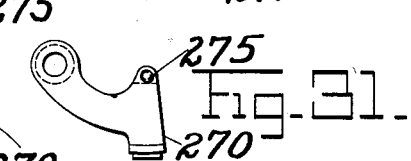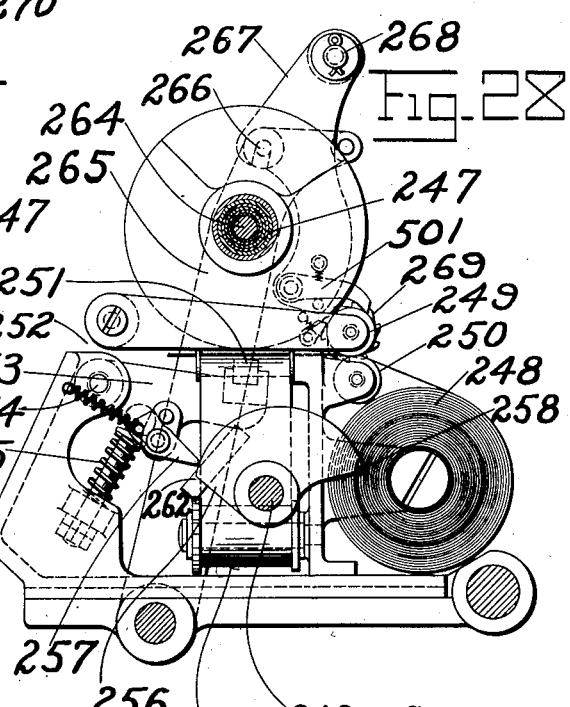

T. CARROLL.
MULTIPLE CASH REGISTER.
APPLICATION FILED MAY 27, 1910.
1,150,997.
Patented Aug. 24, 1915.
20 SHEETS—SHEET 14.
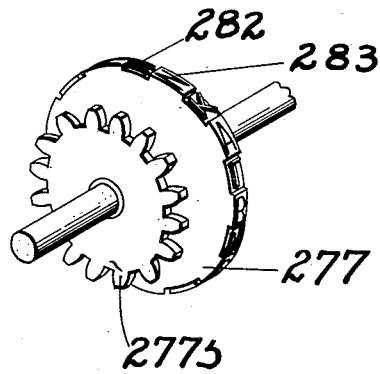
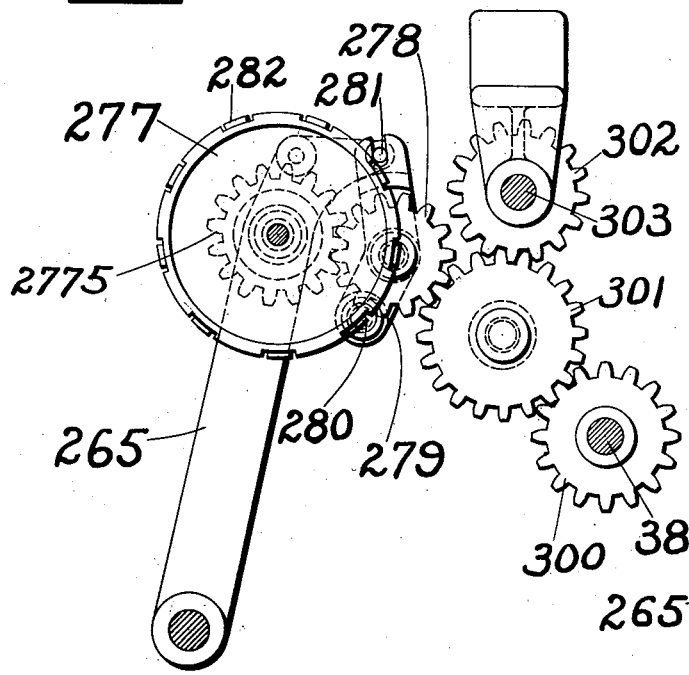
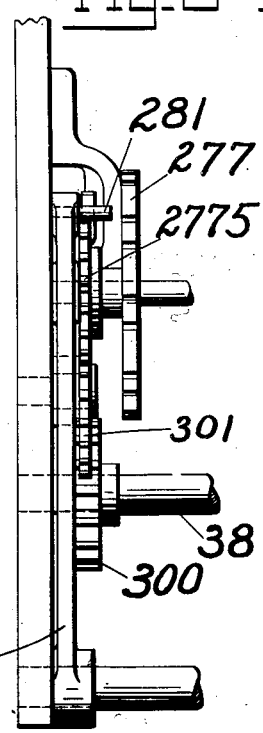
Witnesses
Inventor

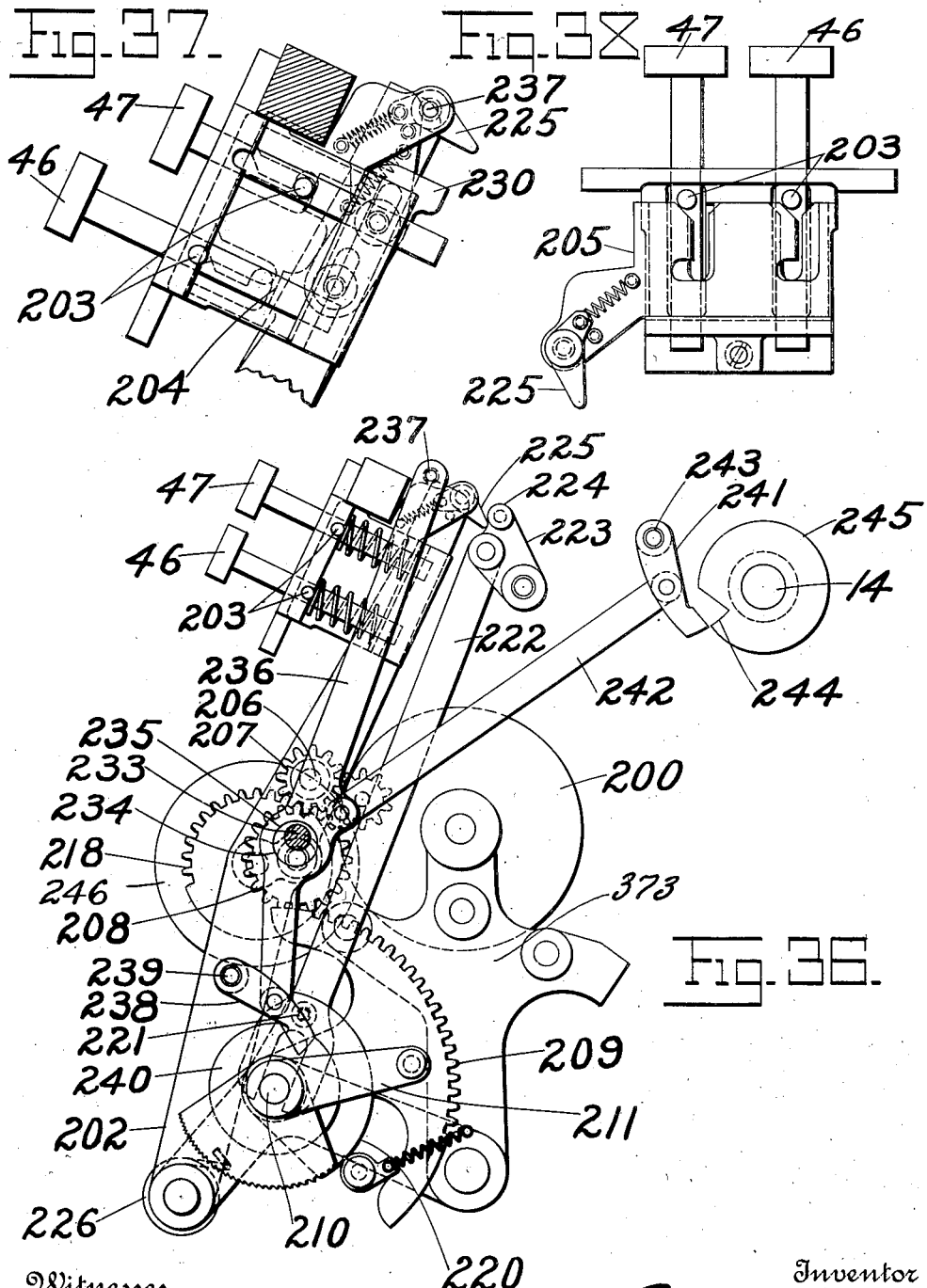

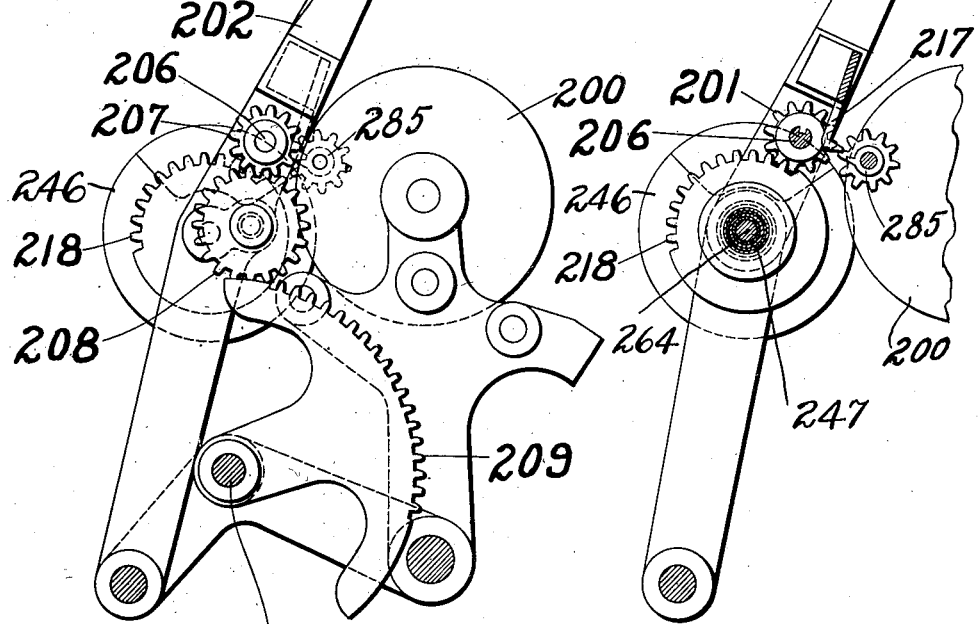

T. CARROLL.
MULTIPLE CASH REGISTER.
APPLICATION FILED MAY 27, 1910.

1,150,997.

Patented Aug. 24, 1915.
20 SHEETS—SHEET 17.

Witnesses
Inventor

T. CARROLL.
MULTIPLE CASH REGISTER.
APPLICATION FILED MAY 27, 1910.
1,150,997.
Patented Aug. 24, 1915.
20 SHEETS—SHEET 18.
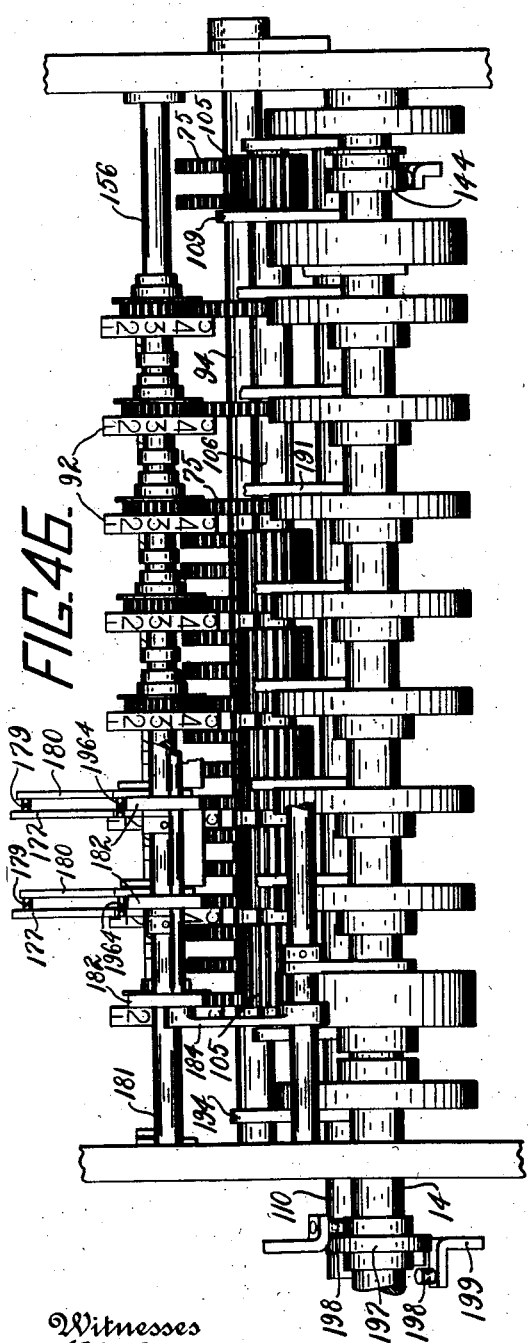
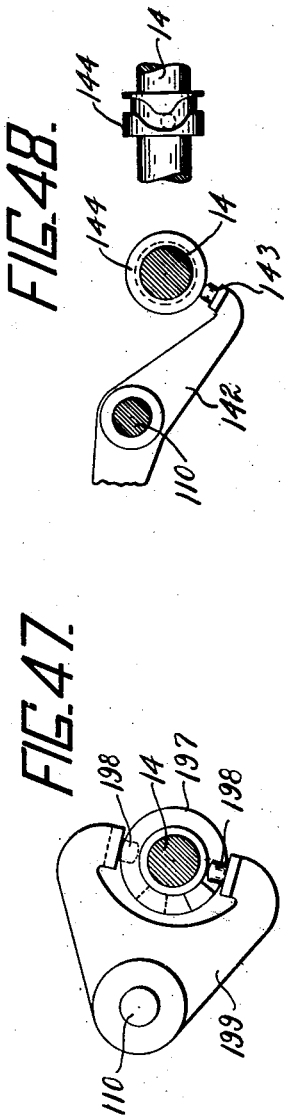

T. CARROLL.
MULTIPLE CASH REGISTER.
APPLICATION FILED MAY 27, 1910.
1,150,997.
Patented Aug. 24, 1915.
20 SHEETS—SHEET 19.
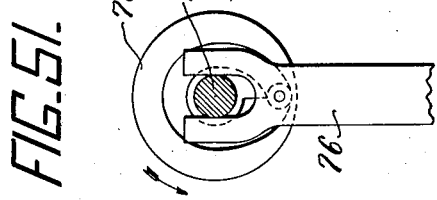
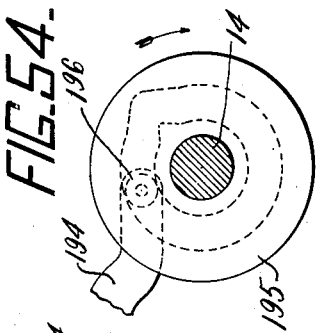
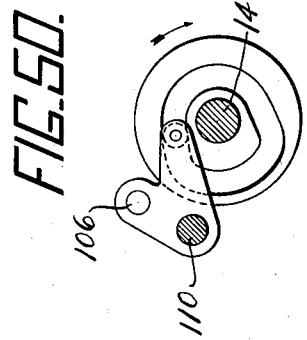
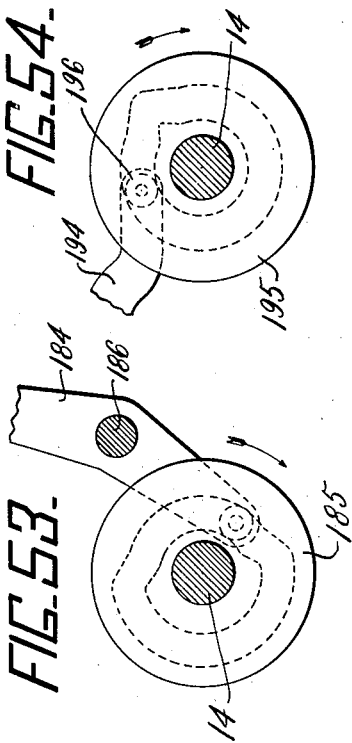
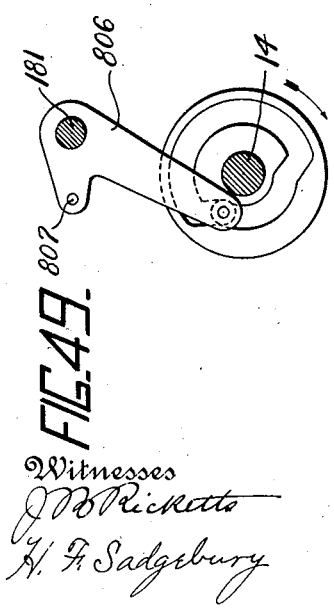
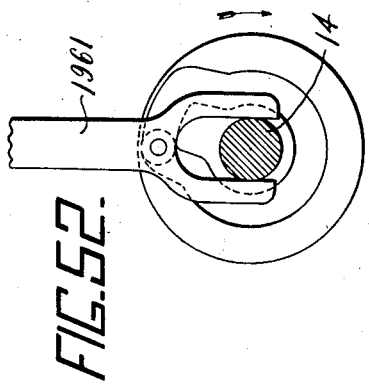
Witnesses
J. B. Ricketts
H. F. Sadgebury
Inventor
Thomas Carroll
by R. C. Glass.
Attorney

T. CARROLL.
MULTIPLE CASH REGISTER.
APPLICATION FILED MAY 27, 1910.

1,150,997.

Patented Aug. 24, 1915.
20 SHEETS—SHEET 20.

Witnesses
JBRicketts
H. F. Sadgebury

Inventor
Thomas Carroll
by R.C.Dean
Attorney

UNITED STATES PATENT OFFICE.

THOMAS CARROLL, OF DAYTON, OHIO, ASSIGNOR TO THE NATIONAL CASH REGISTER COMPANY, OF DAYTON, OHIO, A CORPORATION OF OHIO, (INCORPORATED IN 1906.)

MULTIPLE CASH-REGISTER.

1,150,997. Specification of Letters Patent. Patented Aug. 24, 1915.

Application filed May 27, 1910. Serial No. 563,779.

*To all whom it may concern:*

Be it known that I, THOMAS CARROLL, a citizen of the United States, residing at Oakwood, Dayton, in the county of Montgomery and State of Ohio, have invented certain new and useful Improvements in Multiple Cash-Registers, of which I declare the following to be a full, clear, and exact description.

This invention relates to cash registers and has to do generally with what are known as multiple totalizer machines.

Among its main objects is to provide a machine having a plurality of totalizers which may be allotted to different clerks or different departments, thereby permitting a number of separate summations of amounts, with means for at any time printing the total from any or all of the separate totalizers.

A further object is to improve the means by which any desired totalizer may be brought into coöperative relation with the actuating mechanism. To this end the invention employs the usual operating crank handle of the machine, providing it with a connection such that rotation of the handle will position the proper totalizer and rotation of the crank will then actuate the machine.

Another improvement consists of a totalizer indicator for exhibiting the positions of the totalizers relative to the operating mechanism and so constructed that the separate indicia thereon maintain a vertical position whereby they may readily be read.

A further improvement consists in a novel selecting mechanism for determining which of a series of cash safes shall be released, this mechanism being controlled by the handle which positions the several totalizers relative to the operating mechanism.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 45:
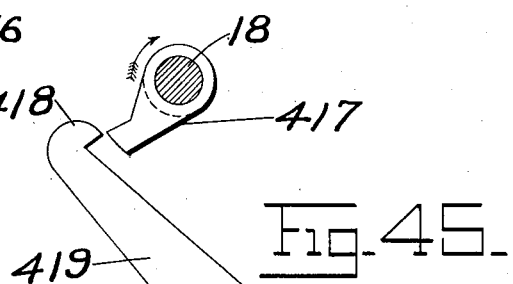
Figure 23:
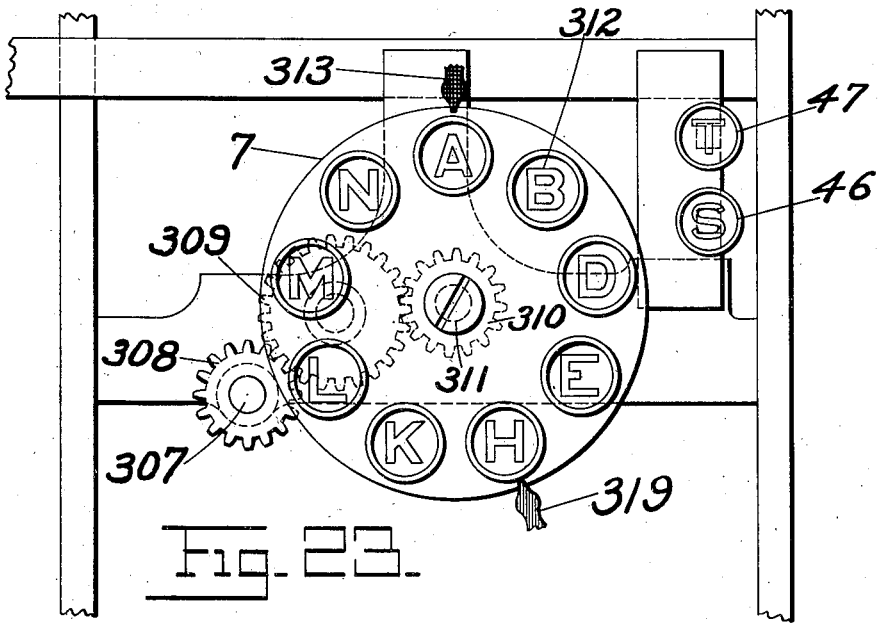
Figure 24:
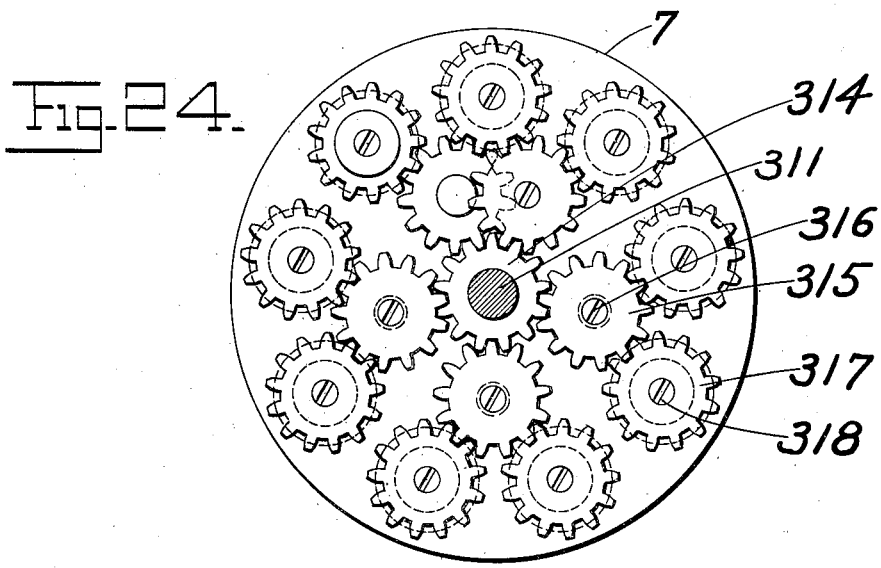
Figure 44:
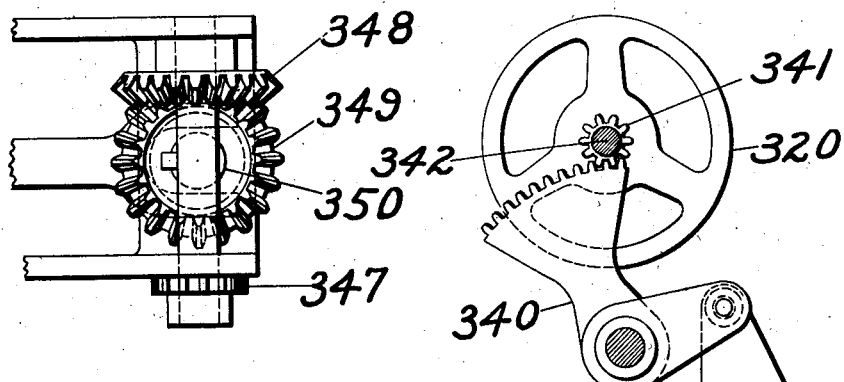
Figure 43:
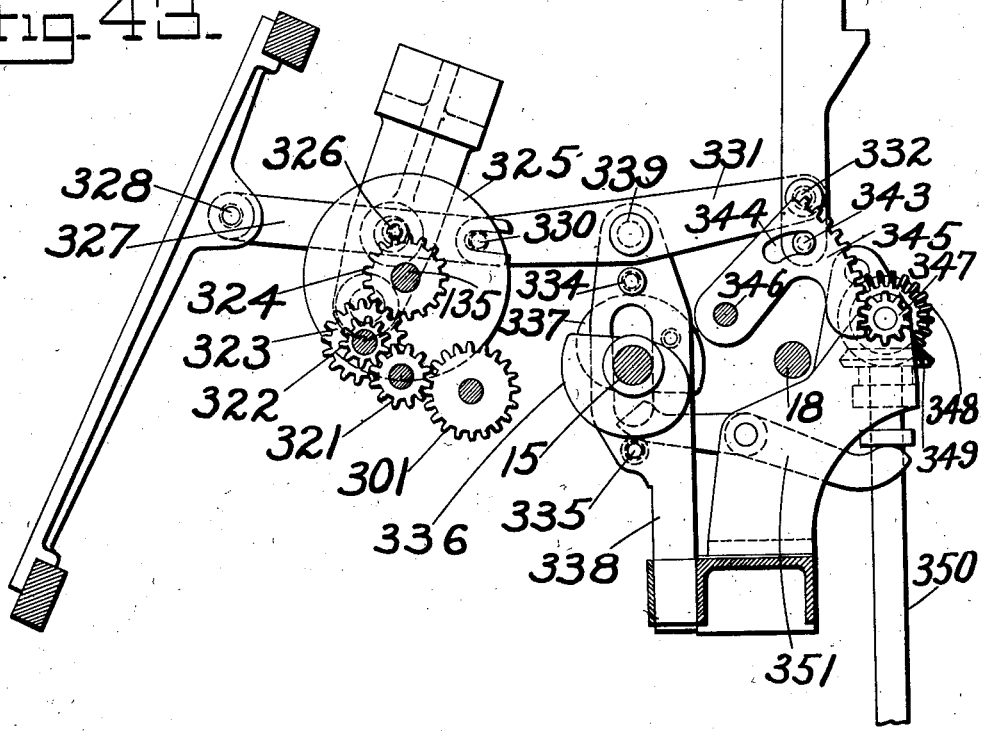
Figure 57:
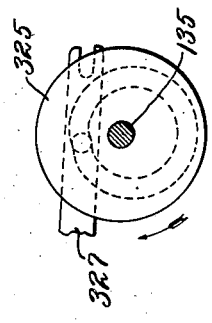
Figure 60:
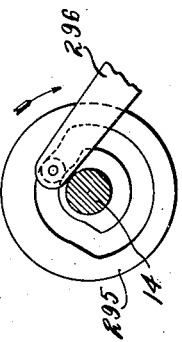
Figure 56:
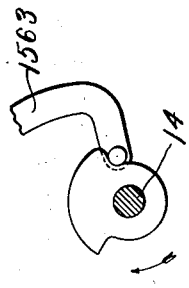
Figure 59:
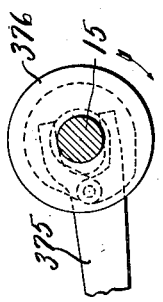
Figure 62:
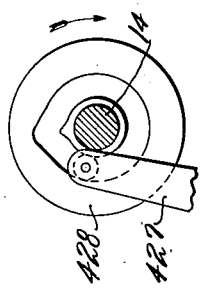
Figure 55:
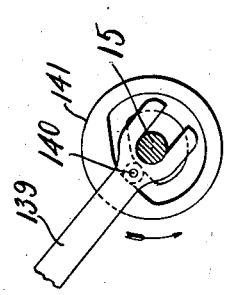
Figure 58:
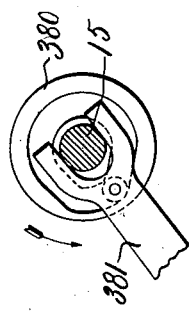
Figure 61:
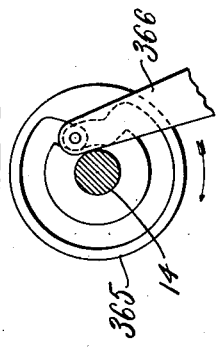

Of said drawings: Figure 1 is a front elevation of a cash register constructed according to this invention, the cabinet and multiple drawers being omitted. Fig. 2 is a right side elevation of the driving mechanism of the register. Fig. 3 is a detail of the mechanism which is operated before operating the machine to permit the operation of the machine and also disconnect the handle of the operating crank from the multiple totalizer setting mechanism. Fig. 4 is a front view of the device shown in Fig. 3. Fig. 5 is a right side elevation of one of the banks of value keys with the key segment which is operated by the bank and also the key detent and mechanism for operating the same. Fig. 6 is a left side view of the key detent showing its relation to the bank of keys. Fig. 7 is a right side elevation of one of the key segments, the mechanism for returning the key segments to their initial position and the main totalizer. Fig. 8 is a detail of part of the actuating mechanism which is shown in Fig. 7. Fig. 9 is a top plan view of the main or cash totalizer. Fig. 10 is a right side elevation of the main totalizer. Fig. 11 is a transverse vertical section taken on the line 11—11 of Fig. 9. Fig. 12 is a detail of one of transfer pawls and a retaining pawl for the same. Fig. 13 is a detail of the retaining pawl and overthrow preventer. Fig. 14 is a detail of the main totalizer throwout mechanism. Fig. 15 is a transverse vertical section of the register taken on the line 15—15 of Fig. 1. Fig. 16 is a right side elevation of the controlling mechanism of the check printer. Fig. 17 is a top plan view of gears which are also shown in Fig. 16. Fig. 18 is a right side elevation of the bank of special keys. Fig. 19 is a front view of the bank of special keys. Fig. 20 is a detail of one of the special keys. Fig. 21 is a right side elevation of the mechanism for setting the clerk's totalizer dial indicator. Fig. 22 is a front view of part of the mechanism shown in Fig. 21. Fig. 23 is a front view of an indicating dial for the clerks' totalizers. Fig. 24 is a detail of gearing of the indicating dial of the clerks' totalizers. Fig. 25 is a right side elevation of multiple totalizers. Fig. 26 is a transverse vertical section of the multiple totalizers including the actuating devices and transfer mechanism for the same. Fig. 27 is a front elevation of the printing device which serves to print the totals of the multiple totalizers. Fig. 28 is a right side elevation of the same. Fig. 29 is a detail of one of the type-carriers of the printer of the multiple totalizers. Fig. 30 is an end view of one of type-carriers. Fig. 31 is a side elevation of a zero type. Fig. 32 is an end view of the zero type. Fig. 33 is a right side elevation of the clerk's initial type-carrier and gearing for setting the same. Fig. 34 is a front view of the mechanism shown in Fig. 33. Fig. 35 is a perspective view of the clerk's initial type-carrier. Fig. 36 is a right side elevation of the clerk's totalizer printing and resetting mechanism. Fig. 37 is an enlarged detail of part of the mechanism shown in Fig. 36. Fig. 38 is a detail of the keys and key detent which are shown in Fig. 37. Fig. 39 is a detail of part of the mechanism shown in Fig. 36. Fig. 40 is a detail of part of the mechanism shown in Fig. 39. Fig. 41 is a detail of some pinions shown in Fig. 40, illustrating the manner of mounting the same. Fig. 42 is a detail in perspective showing the manner of mounting the pinions which are shown in Fig. 41. Fig. 43 is a detail in right side elevation of the mechanism for setting the clerk's initial indicator drum and of the selecting mechanism for the cash drawers. Fig. 44 is a detail in top plan of the drawer selecting mechanism. Fig. 45, Sheet 7, is a detail of a device by which the machine may be prevented from operating when a certain cash drawer is in its open position. Fig. 46 is a top plan view of the totalizing mechanism showing the operating mechanism for the transfer means. Figs. 47 and 48 are detail views of the cams and mechanism for shifting a member of the totalizer laterally during the operation of the machine while recording special transactions and also while printing totals. Figs. 49, 50, and 51 are details of various cams shown in Fig. 8. Fig. 52 is a detail of a cam shown in Fig. 10. Figs. 53 and 54 are details of cams shown in Fig. 11. Figs. 55 and 56 are details of cams shown in Fig. 15 of the drawings. Fig. 57 is a detail of a cam shown in Fig. 43. Figs. 58 and 59 are details of cams shown in Fig. 25. Figs. 60, 61, and 62 are details of cams shown in Fig. 26.

Constructions generally similar in function to some of the constructions shown in the drawings are described and shown in copending applications and patents of Thomas Carroll for cash registers, namely, an application Serial No. 172,970, filed September 12th, 1903, an application Serial No. 270,786, filed June 22nd, 1905, an application Serial No. 355,924, filed February 5th, 1907, and an application Serial No. 501,235, filed June 10th, 1909.

As the machine is hereinafter described the several totalizers are allotted to different clerks but it will be evident that such an arrangement is illustrative merely and that they may be employed in many other relations.

The register which is shown in the accompanying drawings is designed to accomplish the following results: To record by printing and indicating, items of different classes of transactions; to accumulate in a main totalizer all the items of cash transactions; to accumulate in each clerk's totalizer, the amount of all transactions which the clerk effects; and to issue a printed voucher of each transaction recorded by the machine. The machine is also provided with means for causing the voucher issuing mechanism to become inoperative; for making printed records of totals which are accumulated by the main or cash totalizer; and for making printed records of totals accumulated by the clerks' totalizers. These units will be described in the order given.

Records are made in the machine by first depressing the keys which represent the amount to be recorded and if the record is to be of other than a cash sale, a key representing the class of transaction will be depressed and by rotating the crank handle, the clerk's totalizer setting mechanism will be operated. The crank is then rotated causing the main drive shafts of the machine to make one rotation operating the totalizers and the indicators and the check and detail printing mechanism according to the manipulation of the keyboard.

The totals of the main totalizer may be transferred to the type-carriers of the check and detail printer by disconnecting the totalizer from the differential mechanism and connecting it to the mechanism which sets the type-carriers, and then resetting the totalizer by hand, after which the machine is operated to cause the platens to effect printing of the amount set up by the type-carriers. If it is desired to print the total which has been accumulated by any one of the clerks' totalizers such totalizer is first brought to operative relation with the printing mechanism and then is reset by a manipulative device causing the total to be transferred to the type-carriers, and also actuating the platen to effect an impression. The clerks' totalizers may also be left in their reset position or returned to their original setting.

Having reference to the drawings in Fig. 1, 1 indicates the handle of an operating crank by which the driving mechanism of the machine is actuated, 2 the five banks of value keys which keys control the differential mechanism, 3 the one bank of special keys, 4 the main totalizer, 5 the indicators, 6 the check and detail printer, 7 an indicating dial showing which of the clerks' totalizers is in operative relation with the differential mechanism, and 8 the printer by which the totals of the clerks' totalizers are printed.

*Driving mechanism.*—The crank handle 1 is loosely journaled in the crank 9 (Fig. 2)

which is journaled upon a stub shaft 10 and fixed to a pinion 11. The pinion 11 meshes with a gear 12 which in turn meshes with a gear 13, fixed to a drive shaft 14. The gear 12 is fixed to a drive shaft 15 which carries a gear 16 (Fig. 15) meshing with a gear 17 fixed upon a third drive shaft 18. The shafts 14, 15, and 18 are caused to make one rotation upon each operation of the machine by twice rotating the crank 9 and the drive shafts are prevented from rotating beyond their home positions by a stop 19 (Fig. 2) which is engaged by a pin 20 carried by the gear 12 as the gear nears its home position. The pin 20 acts upon a surface 21 of an arm 22 of the stop, rocking a projection 23 thereon into the path of a shoulder 24 of a plate 25 which is riveted to the gear 12. A spring 26 tends to draw the stop 19 downwardly out of the path of the shoulder 24 and in order to disengage the gear 12 from the stop 19, before operating the machine, the crank 9 is rocked rearwardly a slight distance, enough to carry the shoulder 24 free from the arm 23 of the stop. The stop 19 then rocks downwardly under the action of its spring, bringing the arm 22 in front of the pin 20, thereby permitting the drive shafts to be rotated in a forward direction.

The gear 13 carries a pin 27 which co-acts with a machine lock 28 which may be rocked into or out of engagement with the pin 27 either to prevent or to permit the operation of the machine. The rocking of the lock 28 is controlled by a lock and key (not shown in the drawings).

The machine stop 19 is provided with a series of gear teeth 36 and these are adapted to mesh with the teeth of a mutilated pinion 37 loosely mounted on a sleeve 716, this sleeve being fast to one of the frame sections. A shaft 38 passes loosely through this sleeve 716 and through the pinion 37 and has rigidly mounted at the end thereof a gear pinion 41. A slot 40 is cut in the mutilated gear 37 and is adapted to coöperate with a pin 39 fast in the stationary sleeve 716. The crank handle 1 has mounted thereon a gear pinion 43 adapted at certain times to mesh with the gear pinion 41. It being understood that the teeth 36 of stop 19 continuously mesh with the teeth of pinion 37, it will be seen that a backward movement of the crank 9 will carry the shoulder 24 of the locking plate 25 away from the stop 19 and permit its spring 26 to move it downwardly. This downward movement will rotate the mutilated gear 37 and at the same time by causing the slot 40 to traverse the stationary pin 39, will move the pinion 37 over the supporting sleeve 716. The pinion 41, which was stated to be fast on the shaft 38, is provided with a sleeve having a flange passing inside a complementary flange of the pinion 37, therefore when the pinion 37 is rotated and axially moved with the pinion 41 the shaft 38 will also be axially moved with it, thereby moving the pinion 41 out of the path of the pinion 43 carried by the crank handle. The handle then may be given its forward rotation but as the gear 12 completes its rotation the pin 20 will engage the camming edge 21 of stop 19 thereby lifting the stop against the tension of its spring 26. Such elevation of the stop reversely rotates the pinion 37 thereby causing a reverse axial movement of both pinions 37 and 41 and shaft 38 so as to bring pinion 41 into the path of the handle pinion 43 at the end of the operation. The shaft 38, as hereinafter described, has mounted fast thereon a pinion 300, shown in Fig. 22, which is connected to the totalizer reel and to the clerk's indicator. It will be seen from this figure that pinion 300 is wide enough to remain in mesh with the next pinion of the train in either position of the shaft 38. It will also be clear that a rotation of the handle 1 will rotate the gear pinion 41 and thereby position differentially, as desired, the totalizer reel and clerk's indicator.

*Keyboard.*—The keyboard as shown in Fig. 1 consists of a plurality of banks of amount keys 2, three special keys 3 (received on account, charge, and paid out), a key 44 which when depressed prevents the operation of the check printing mechanism, a key 45 which when depressed permits the printing of the total which has been accumulated by the main totalizer 4, and total and subtotal keys 47 and 46 which, when either one is depressed, permit the printing of the total of the clerk's totalizer which is in operative relation with the printing device 8, the depression of the key 46 merely permitting the printing of the total while the depression of the key 47 permits both the printing of the total and resetting of the totalizer. The operation of the amount keys 2 will be next described, while the keys 3, 44, 45, 46, and 47 will be described under separate headings.

The amount keys 2 are arranged in denominational groups or banks, each bank being numbered from "one" at the top to "nine" at the bottom and are all similar in construction. The keys are slidably mounted in frames 48 (Fig. 5) and are depressible against the action of springs 49 which bear between pins 50 carried by the shanks of the keys and a shoulder 51 of the frame 48. The pins 50 extend across inclined edges 52 (Fig. 6) of spring pressed key detents 53. Therefore the depression of a key causes a key detent to rise against the action of its spring 54 and to again spring downwardly and retain the key in its depressed position when the pin 50 of the key arrives opposite a notch 55 at the side of a slot 56 in which the pin travels.

Each key detent carries a pin 57 extending into a cut 58 in an arm 59 which is fixed to a shaft 60 and when any key is depressed, the arms 59 are rocked upward slightly, drawing a pitman 61 forwardly but permitting the arms 59 and the pitman 61 to be restored to the position in which they are shown in Fig. 5 by springs 605, coiled around the shaft 60, when the key pin 50 reaches the detent notch 55. The pitman 61 carries a lug 67 which co-acts with a shoulder of a disk 66 carried fast on the shaft 15 to prevent rotation of the shaft and thereby operation of the driving mechanism when the pitman is in its forward position during the depression of a key. Soon after the drive shafts start to rotate, the depressed keys are released by a cam 64 on drive shaft 15 engaging a pin 65 on the pitman 61 which rocks the shaft 60 causing the lower edge of the cuts 58 in the arms 59 to engage the pins 57 of the detents, and raise the same out of engagement with the keys, thereby permitting the keys to return to their undepressed positions under the action of the springs 49. As the shaft 15 completes its rotation, the shoulder 66 engages the inclined surface of the lug 67 on the pitman 61 and thereby positively returns the pitman to its original position.

*Differential mechanism.*—Each bank of amount keys controls the action of a segment gear 68 through an arm 69 (Fig. 7) which is engaged by the pins 50 upon the depression of any key and is connected to the segment gear 68 by a pin and slot 70. The arm 69 is loosely pivoted upon a shaft 71 and the segment 68 is pivoted upon an arm 72 fixed to a shaft 73. The arm 69 is provided with nine surfaces 74 which are cut to be in such relation with the pins 50 of the keys, which are all depressible equal distances, that the keys will rock the arm 69 one unit or more of a possible nine units of movement according to their value. As the arm 69 is pivotally connected to the segment gear 68 at 70, the segment gear will rock rearwardly an equal number of units upon the depression of a key. The segment gear 68 meshes with a normally idle pinion 75. Therefore this idle pinion will be rotated according to the differential rocking of the segment 68. When the segment gear 68 is in its rear position, the shaft 73 is slightly rocked causing the arm 72 to lower the segment 68 out of mesh with the idle pinion 75 so that upon the return of the segment 68 the differential setting of the pinion 75 will not be effected. The pinion 75 is returned to its original position by separate mechanism which will be described in connection with the main totalizer but when returned is operatively connected to elements of the same denominational order in a totalizer, to the indicators, and to the printer.

The rocking of the shaft 73 for the purpose of lowering the segment gear 68 is accomplished by a pitman 76, which is pivoted to an arm 77 fast on the shaft 73. The segments 68 are, of course, rocked rearwardly upon the depression of the keys, before the drive shafts start to rotate. Immediately upon the starting of the rotation of the drive shafts, a cam 78 on shaft 15 raises the pitman 76 thereby causing all of the segment gears 68, which are controlled by the value keys, to lower out of engagement with their respective pinions 75 and the keys are at this time released. The members 69, to which the segments are pivoted, are provided with shoulders 79 at which point they are engaged for the purpose of returning the same with their corresponding segments to their zero positions by a rod 80 extending across the rear edges of all the shoulders 79 and carried by a pair of plates 81 fixed to the shaft 71 and one of which is pivoted by a pin 82 to a pitman 83. The pitman 83 is actuated at the proper time to cause the return of the segments 69 and their corresponding segment gears by a cam 84 which is carried by the drive shaft 15.

In order to prevent overthrow of the members 69, each one of these members co-acts with a sliding plate 85 (Figs. 5 and 6) which is pivotally connected to its respective member 69 by a pin 86 and is provided with graduated inclined slots 89 opposite the pins 50 of the keys. Therefore upon the depression of a key the slide 85 will be moved downwardly an extent which corresponds to the value of the key depressed, that is, the depression of the nine key will cause the slide to move downwardly nine times as far as the depression of the one key will cause it to move. When the pin 50 of the depressed key reaches the inner end of the slot 89 it is impossible for the respective slide 85 to move further downwardly and for this reason the graduated member 69 cannot rock farther inwardly than the intended extent. The members 69 with their companion segment gears 68 are urged to their normal zero positions, as shown in Fig. 5, by springs 90, though both the forward and the return movements of the members 69 are caused by positively actuated devices. The springs 90 also tend to prevent excess rearward movement of the segments the spring tension causing them at all times to bear against the pins 50 of the depressed keys.

*Main totalizer.*—The main totalizer is illustrated in Figs. 7, 9, 10 and 11. It comprises a plurality of pinions 91 having ten teeth each and each pinion carries a drum 92 bearing the numerals "cipher" to "nine." Each of the totalizer pinions meshes with a pinion 93 which is loosely mounted upon a shaft 94 upon which the pinions 75 are also loosely mounted but the pinions 75 each carry a pawl 95 which rests in a groove 96 in the shaft 94 when the shaft and pinions are in their normal zero positions. When the pinions 75 are rotated by the segments 68, the pinion or pinions which are rotated the greatest amount cause the shaft 94 through the pawls 95 to rotate a like extent.

The shaft 94 carries a pinion 99 (Fig. 8) which meshes with a segment gear 100 pivoted upon a shaft 101 and carrying a roller 102 which, upon movement of the segment, comes more or less into the path of a cam 103 secured to the shaft 14. The extent to which the roller is brought into the path of the cam, of course, depends upon the extent of rotation of the shaft 94 and when the drive shaft is rotated, the cam engages the roller 102 returning the segment 100 to its original position and by it the shaft 94, the groove 96 of which engages the pawls 95 of the gears 75 at whatever position the gears may be in, and consequently the gears 75 are returned the same extents that they were first moved forwardly. Therefore, the return movement of the gear 75 may be utilized to transfer the differential movement of the segment gears 68 to recording devices and is utilized for the purpose of adding the amount involved to the main totalizer and causing the amount to be set up on the indicators, and also to be added to one of the clerks' totalizers, provided the transaction is of such a class that it should be recorded in all these devices.

At the time the segment gears 68 are at rest in their set positions, and when the main drive shafts of the machine start to rotate, a set of broad pinions 105 which are loosely carried on a shaft 106 are moved into mesh with the pinions 75 connecting the same to similar pinions 93 and 108 (Fig. 9), which are loosely journaled on the shaft 94, but are not provided with pawls 95.

The shaft 106 is carried by a pair of arms 109 (Fig. 10) which are loosely pivoted upon a shaft 110 and carry rolls 111 which extend into races of cams 112 which are fixed to the drive shaft 14. Upon the rotation of the drive shaft, these cams rock the arms 109 to carry the broad pinions into mesh with the pinions 75, 93 and 108 at the proper time. After this is accomplished the further rotation of the shaft 14 brings the cam 103 into engagement with the roll 102 on the segment gear 100 (Fig. 8), thus rotating the shaft 94 and causing the pinions 75 to be returned to their original positions and the two sets of pinions 93 and 108 to be rotated extents which correspond to the extents of rotation of their corresponding pinions 75. The pinions 93 mesh with the totalizer pinions 91 and therefore rotate the totalizer pinions in correspondence with the extents of rotation of the pinions 75 thus adding the amount which was set up on the keyboard, to the main totalizer. The pinions 108 mesh with large intermediate segment gears 113 (Fig. 15) which are provided with rack teeth 114 for meshing with the pinions 108 and with a second set of rack teeth 115 which mesh with pinions 116 and 117. The pinions 116 are carried by a shaft 118 and a plurality of concentric tubes 119 surrounding the shaft and thus communicate the differential movement of the segments 113 to type carriers 120 (Fig. 1) of the detail and check printer 6. The pinions 117 are carried by a shaft 121 and a plurality of concentric tubes 122 surrounding this shaft and carrying actuating gears 123 (Fig. 26) for the clerks' totalizers 124 and thereby serve to transfer the differential movement of the segments 113 to the clerks' totalizers. The construction of the clerks' totalizers will be described later under a separate heading.

Gears 93 and 108 when not being actuated are locked against movement by teeth 420 (Fig. 10) fast upon shaft 110 and rigid with an arm 421 provided with a roll 422 in co-acting relation with a cam 423 fixed to drive shaft 14. This cam serves to hold the teeth in mesh at required times, a spring 424 serving to rock the teeth out of mesh when the cam passes away from the roller 422. For special transactions the totalizer is not actuated and it is not desirable to release the teeth 420. To this end a pair of arms 501 (Fig. 15) and 502 (Fig. 8) are mounted fast on a shaft 503. The segment 69 for the transaction bank is provided with a pin 504 positioned to engage a cam edge of arm 501 and thereby to rock the arm 502 upwardly when any key in the bank is depressed. The shaft 110 has fast thereon a depending notched arm 505 with which a hook 506 on arm 502 co-acts to lock the arm 505 and therefore the shaft 110 from movement. Thus when any transaction key is depressed pawls 420 remain in locking relation with gears 93 and the main totalizer cannot be displaced either by accident or design.

When the segments 113 are in their set positions they are locked in such positions for a short period, as described further on, at which time the platens of the check and detail printer are operated. The segment gears 113 are all loosely mounted upon a shaft 135 and this shaft carries fast thereon a plurality of arms 136, which extend across the rear sides of pins 137 carried by the segment gears. Also fast on the shaft 135 are a pair of arms 138 which are connected to pitmans 139 provided with rolls 140 extending into the races of cams 141 fixed to the shaft 15. These cams permit the setting of segments 113 and reciprocate the pitmans 139 after the broad pinions 105 have been unmeshed, thus moving arms 136 into engagement with the pins 137 at whatever position they may be in, and returning all of the segments 113 to their original positions. As the pinions 108 with which the segments mesh are not at such time in mesh with the broad pinions 105, these pinions 108 will be idly returned to their original position.

Carrying operations between the totalizer pinions 91 are accomplished by mechanism which may be next described. This transfer mechanism operates generally in the manner of that shown in the before mentioned application No. 355,942. Each totalizer pinion carries a transfer cam 167 (Fig. 12) which when the pinion passes from "nine" to "zero" engages a shoulder 168 on a pawl 169 which is loosely pivoted upon a shaft 170 and rocks the pawl downwardly. The pawls 169 are held in their tripped positions by retaining pawls 171. The retaining pawls normally engage the pawls 169 at notches 172, but when pawls 169 are forced downwardly by the transfer cams 167 the retaining pawls 171 are cammed out of engagement with the notches 172 causing their noses 173 to enter notches 174 in plates 175 which are carried by the pinions 93. The notches 174 are opposite the noses 173 only at the moment in which the respective totalizer pinion is passing from "nine" to "zero". Therefore the retaining pawls can only be rocked at precisely such time. By the time the totalizer pinion has reached its zero position, the notch 174 will have moved far enough to have caused the pawl 171 to be returned to its normal position and be held in such position by the periphery of the disk 175 but the retaining pawl will then engage the pawl 169 at the notch 176 thereby locking the pawl 169 in its tripped position. The pawls 169 are provided with arms 177 which extend upwardly from the pivots 170 of the pawls and at their upper ends are provided with inclined slots 178. Pins 179 extend through these slots and are carried by plates 180 which are slidably mounted upon a shaft 181 and for this purpose are forked over the shaft. When one of the pawls 169 is rocked downwardly, it through the medium of its inclined slot 178 and the pin 179, will cause the respective plate 180 to be moved in a horizontal direction toward the totalizer. Toothed members 182 are slidably mounted upon the shaft 181 and are each provided with two teeth 183 for meshing with a totalizer pinion. There is one of these toothed members for each pinion of the totalizer and each is located at the side of a plate 180 which is controlled by a pawl 169 of the pinion of next lower order than the pinion with which the toothed member 182 is adapted to mesh. All of the members 182 are slid forwardly into mesh with the totalizer pinions immediately after the pinions have been rotated by a pair of levers 184 which are pivotally mounted on a shaft 186 and are rocked by cams 185 fixed to the shaft 14. It is possible to rock the toothed ends of the members 182 upwardly around the shaft 181 in order to rotate their respective pinions one tooth space, and for this purpose their companion plates 180 are rocked upwardly around the pivots 181 after the toothed members 182 are in mesh with the totalizer pinions 91. The operating plates 180 are provided with shoulders 187 which co-act with lugs 188 on the toothed members 182 when both the members 182 and the plates 180 are in their forward positions as is the case when a transfer is to take place. The members 180 are provided with slots 189 projecting into which are pins 190 carried by bell crank levers 191. The bell crank levers 191 are rocked successively beginning from the bell crank lever of lowest denominational order, by cams 192 which are carried by the shaft 14.

If one of the plates 180 is not carried toward the totalizer by the tripping of its respective pawl 169, a cut away part 193 of the plate will be beneath the lug 188 of its respective toothed member 182 at the time the bell crank levers 191 are rocked upwardly. Therefore the toothed member 182 for such plate will not be carried upwardly, but it will merely remain in mesh with its respective totalizer pinion preventing the same from accidental rotation at the time of possible transferring in other pinions of the totalizer.

After the carrying operation has taken place it is necessary to disengage the retaining pawls 171 from the transfer pawls 169 so that the transfer pawls may be restored to their normal position ready for the next operation of the machine. It is not possible at this time to rock the retaining pawls around their pivot 1193 as the disks 175 are in the paths of the ends 173 of the pawls. For this reason the rod 1193 upon which the retaining pawls are mounted is carried by levers 194 which are pivoted upon the shaft 94 and may be rocked around this pivot, so as to cause the pawls to move downwardly out of engagement in an arc which is concentric to the shaft 94. This is accomplished by cams 195 which are carried by the shaft 14 and at the proper time engage rollers 196 on the levers 194.

In order to reset the transfer elements the shaft 181 rigidly carries a series of disks 1963 thereon having cut away portions engaging pins 1964 carried by the operating elements or plates 180. Also fast to shaft 181 is an arm 1962 (Fig. 10) fastened to a pitman 1961 which is adapted to be reciprocated by a cam on shaft 14. As before stated, these operating plates 180 are moved forward by the trip levers 169 only when carrying is necessary. Just before the plates 180 are moved forward, the pitman 1961 is drawn downward by its cam, and, acting through the arm 1962, partially rotates the shaft 181 and carries the shoulders of the cut-away portion of the disks out of the path of the pins 1964 of the plates 180, and holds the disks in that position until the carrying operations are completed. After the plates 180 have been moved upward by the arms 191 and returned to normal position, the pitman 1961 rocks the shaft 181 back to its original position, causing the notches of the disks 1963 to restore the operating plates 180 to their normal rearward position.

When the machine is operated to record a transaction other than a cash sale, such as "Charge" or "Paid out", it is preferable to disconnect the main totalizer from the differential mechanism so that the amount of such transaction will not be added to the main totalizer, but will be recorded merely by the printing mechanism and added to the clerks' totalizers if desired. This disconnecting of the totalizer is accomplished by shifting the broad pinions 105 in an axial direction so that the same will not be meshed with the pinions 93 which actuate the totalizer but will mesh with the pinions 75 and the pinions 108, thus transferring the differential movement of the segment 68 in the usual manner to the segment gears 113. In order to shift the pinions 105, the shaft 110 which carries the pinion carrying arms 109, has pivoted thereon between a pair of fixed collars a lever 142 (Fig. 14) which carries a roller 143 and may be rocked to carry the roller 143 into the groove of a cam 144 fixed to the shaft 14. When the roller is in the path of the cam the rotation of the shaft 14 causes the lever 142, with its shaft 110, to be moved in the direction of the length of the shaft carrying the broad pinions out of mesh with the pinions 93. The rocking of the lever 142 is controlled by the special keys 3 as shown in Fig. 14. The pins 50 of the special keys co-act with inclined cam notches 145 in a plate 146 for the purpose of lowering the plate upon the depression of one of the special keys. The plate 146 has a projection 147 pivoted to an arm 148 carried by a shaft 149. The shaft 149 also carries an arm 150 which is bifurcated at its rear end to straddle a pin 151 on the lever 142. Because of this connection, when the plate 146 is moved downwardly upon the depression of a special key, the roll 143 is brought into the path of the cam 144. The notch 152 which is opposite the pin 50 of the "No check" key 44 is not inclined as the other notches are, and therefore when this key is depressed, the plate 146 will not be lowered, the key 44 merely controlling the operation of the check printing platen. It could, however, also control the disconnecting of the totalizer whenever a check is not issued, if such arrangement is desired, by simply providing an inclined notch in the plate 46 opposite this key.

It is necessary to disengage the broad pinions 105 from the pinions 93 which mesh with the totalizer pinions 91 to permit the transfer operation, but it is preferable that at the same time the pinions 105 remain in mesh with the pinions 108 for the purpose of locking the segment gears 113 in their set positions at the time the platens are operated and for this purpose the shaft 14 carries a cam 197 (Fig. 47) which is provided with a pair of inclined surfaces acting upon rollers 198 on an arm 199 carried by the shaft 110 which is moved in a longitudinal direction when the rolls 198 are engaged by the cam 197 carrying with it the frame 109 which carries the broad pinions 105. The broad pinions are shifted at this time just far enough to become disengaged from the pinions 93. The right hand side of the cam 197 (Fig. 9) is cut away a certain extent at the point which is opposite the roll 198 when the cam is in its normal position. For this reason the cam 197 does not interfere with the actuation of the shifting cam 144, (Figs. 9 and 14).

In order to reset the main totalizer the pinions thereof are each provided with projecting teeth 601. (See Fig. 9.) These pinions are loose on the supporting shaft 156, but fast on the shaft and adjacent the teeth 601 are collars having projections 602. Two cams 603 and 604 fast to the machine frame coöperate respectively with pins 605 and 606 fast to the totalizer shaft 156, as shown, whereby when said shaft is rotated it will be moved axially to an extent sufficient to bring the collar projections 602 in line with the pinion projections 601. Consequently the collar projections 602 will engage the pinion projections at some time during the rotation and carry the totalizer pinions back to normal or zero position. Such rotation of the totalizer pinions to zero position is employed to adjust the printing devices to print the total on the main totalizer in a manner hereinafter described.

It is desirable to lock the main operating mechanism while the totalizer is being reset and also to prevent the totalizer shaft from being twice rotated without an intervening operation of the machine. To accomplish the first of these functions an arm 701 is mounted loosely on shaft 110 and has a depending lower end adapted to engage a notch 702 in a disk which is fast to the drive shaft 15. At its upper end this arm 701 has a hook adapted to be engaged by a cam carried by the totalizer shaft 156. In Fig. 8 the parts are shown in normal position and it will be seen that the arm 701 does not prevent rotation of the drive shaft 15. If, however, the totalizer shaft 156 is rotated to reset the totalizer pinions, the cam referred to will engage the hooked upper end of arm 701 and move it to the right, thereby carrying the depending end of the arm into the notch 702 and thereby preventing the operation of the machine as long as the totalizer shaft 156 is out of normal position. To accomplish the second function stated above, a disk 801 on the totalizer shaft 156 is provided with a pin 802. Mounted on the shaft 181 by a slot 804 is an arm 805 normally overlying at its forward end the pin 802. Also loosely mounted on shaft 181 is a depending arm 806 carrying a roller adapted to co-act with a cam on drive shaft 14. The depending arm 806 is provided with a pin 807 underlying the forwardly extending arm 805, and a spring, not shown, tends to force the arm 805 forwardly as far as permitted by the slot 804. With this construction it being understood that the parts in Fig. 8 are in normal position, there is no obstacle to the rotation of the totalizer, but when the pin 802 passes from under the arm 805 the arm will drop slightly so that the forward end thereof is in the path of the pin 802, whereby at the end of a complete rotation of the totalizer shaft 156 it is locked against further movement. By the next operation of the machine, however, the cam on shaft 14 Figs. 8 and 49 engages and rocks the arm 806 when its pin 807 will raise the forwardly extending arm 805 from behind the pin 802 and the spring then thrusts the arm 805 slightly forward so as to rest again on the pin 802, therefore the totalizer shaft 156 cannot be given two rotations in succession but an operation of the machine must intervene.

It is desirable to prevent resetting of the main totalizer and printing of totals therefrom while any amount key is depressed. To this end the segments 68 of the amount banks are each provided with a pin 513 (Fig. 8) all adapted to engage cam edges of arms 511 which are all fast on a sleeve 514 surrounding shaft 503. This sleeve also has fast thereto an arm 512 having a squared rear end positioned, when elevated by depression of any amount key, to enter a notch in a disk carried by the totalizer shaft 156, thereby preventing rotation of this shaft to reset the totalizer. The backward rotation of the totalizer pinions 91, pinions 151, and 108 by rotating the segment gears 113, sets the type-wheels 120 with characters at the printing line which correspond to the total amount which has been accumulated by the totalizer. The crank 9 is then rotated effecting operation of the platen of printer 6 (Fig. 1).

It may be seen from Fig. 14 that the key 45 which is depressed when it is desired to obtain a printing of the total accumulated by the main totalizer also co-acts with an inclined slot 145. Therefore when this key is depressed the totalizer will be disconnected from the segment 68.

The printing of totals is accomplished by resetting the totalizer, utilizing the differential movement of the totalizer pinions upon their return for setting up the type wheels of the printer. It is therefore necessary to provide means for so connecting the pinions 93 which mesh with the totalizer pinions with the pinions 108 which mesh with the segment gears 113 meshing with the pinions 116 which are connected to the type-carriers that reverse rotation of the totalizer pinions will effect the desired forward rotation of segments 113. For this purpose a rocking frame 1150 (Fig. 7) is provided, which carries pinions 1151 sleeved together in pairs in line with the pinions 93 and 108. The pinions 1151 are loosely carried on a rod 1152 which by two frame arms 1150 is carried by a shaft 153. This shaft has fast thereon an arm 154 which is provided with a surface 155 inclined with respect to the path of movement of a pin 1156 carried by the total key 45. Therefore upon the depression of this key 45, the shaft 153 is rocked to carry the pinions 1151 into position connecting the pinions 93 and the pinions 108. The frame 150 is restored to its original position by a cam 158 which upon rotation of shaft 15 engages an arm 159 fast on the shaft 153. This, of course, occurs after the release of the key 45 which is released in the same manner as the value keys are released.

When the total key 45 is depressed, the segments 68 are lowered out of engagement with the pinions 75 so that a manipulation of the value keys will not interfere with obtaining a correct total. Upon the depression of key 45 an arm 160 Fig. 7 on shaft 153 draws a link 161 forwardly, thereby disengaging a locking member 162, carried by the pitman 76, from a pin 163. The pin 163, which is carried by the arm 77, extends through a slot 164 in the pitman 76 and is normally connected to the pitman by the locking member 162. Therefore, when the locking member is rocked away from the pin, the segments 68 will be free to lower under the action of spring 165. After the frame 150 is restored to its original position, the pitman 76 is moved upwardly by operation of the machine thereby bringing the locking member 162 again into co-acting relation with the pin 163. Then when the pitman is restored to its original position, the segments 68 are moved into engagement with their respective pinions, leaving the machine in proper condition for the next operation.

Fig. 13 illustrates one of a set of safety devices which are employed in the transfer mechanism. These devices serve to restore any transfer pawl which may be tripped accidentally by a sudden impact of a transfer cam when the cam comes to rest in the "nine" position. If by quick or violent operation of the machine a totalizer pinion is forced slightly beyond its nine position when it should come to rest in the nine position, its cam 167 may drive the respective transfer pawl to its tripped position. But each cam 167 is rigid with a cam 1167 and consequently an overthrow of cam 167 results in an overthrow of the cam 1167 thus bringing its nose in front of the tip of an arm 1695 which is rigid with the transfer pawl. The tripping of the transfer pawl causes arm 1695 to be rocked downwardly into the path of the nose of cam 1167. Then when the cams 167 and 1167 settle back to the nine position the nose of cam 1167 engages the nose of arm 1695, restoring this arm and the transfer pawl to normal position.

*Indicating mechanism.*—The indicators (Figs. 1 and 15) are set to correspond to the amount which is set up on the keyboard at the time the segment gears 113 are at rest in their moved positions. The indicators are arranged in two groups which may be read respectively from the front and rear of the machine. One group of the indicators is driven by the differential mechanism and the indicators of this group are connected with companion indicators of the other group by segment gears 126 which mesh with the pinions 127 of the indicators, and are connected in pairs by yokes 129. The indicator pinions 128 mesh with segment gears 130 which have rearwardly extending arms 131 which by links 132 are connected to beams 133. These beams are differentially rocked to position the indicators and the particular manner of transferring the differential movement of the segments 113 to the indicators is fully described in the copending applications Nos. 172,970 and 355,924 previously mentioned.

It will be clear from Fig. 15 that when segments 113 are rocked, the beams 133 are also differentially rocked around their pivots 134 thus raising the depending arms 1360 and bringing rollers mounted on said arms into the path of two complementary cams mounted on shaft 15. During the operation of this shaft and while the segments 113 are locked in their adjusted positions, one or the other of the complementary cams will engage one of the rollers on each depending arm 1360 and return it subsequently to a constant position, thereby rocking the beams 133 around their pivotal connections with their segments 113 and thus setting the indicators differentially. This mechanism is not novel in the present case and its operation, it is thought, will be clear.

In order to hide the indicators during an operation of the machine, a screen 1460 is provided connected through a link 1461 to an arm 1462 mounted loosely on a rod 1463. Also connected to this arm 1462 is a pitman 1464 having a roller 1465 co-acting with a cam 1466 on the drive shaft 18. It will be seen that when shaft 18 rotates, the cam 1466 will elevate the pitman 1464 thereby moving the screen 1460 to a position concealing the indicators and that the indicators will be exposed again only at the very end of the operation.

In order to aline the indicators in their set positions and to lock them, a series of locking and alining arms 1561 are provided mounted fast on a shaft 1562 which also carries a rigid depending arm 1563 adapted to co-act with a cam on drive shaft 14. It will readily be understood that the cam is so timed as to withdraw the alining arms from the indicators while they are in their set position and then again to lock them in said position between operations of the machine.

*Clerks' totalizers.*—Before the machine is operated the clerk's totalizer to which it is desired to add the amount of the transaction is first brought to operative relation with the driving gears 123 (Fig. 26). These gears, as previously described, are differentially rotated upon the operation of the machine according to the amount which is set up on the keyboard.

The clerks' totalizers 124 are all carried on a reel 200 and this reel may be rotated by rotating the handle 1 of the crank 9 when the pinion 43 (Fig. 2), which is secured to the handle 1, meshes with the pinion 41. It was previously stated that the pinion 43 meshes with the pinion 41 before the crank 9 is moved backwardly in order to unlock the machine.

The shaft 38 (Fig. 21) which carries the pinion 41 also carries a gear 300 which meshes with an intermediate gear 301 meshing with a gear 302 on a shaft 303 which is in line with a shaft 304 to which is secured the clerk's totalizer reel 200. The shaft 303 carries fixed thereon a bevel gear 3055 meshing with an intermediate bevel gear 306 in turn meshing with a bevel gear 305 on the totalizer reel shaft 304. It will thus be seen that when the crank 9 is in home position and the pinion 43 of handle 1 is in mesh with pinion 41, a turning of the handle, while the crank remains stationary, will result in an adjustment of the shaft 38. This adjustment is transmitted to a shaft 303 through the medium of gears 300, 301 and 302 and thence to shaft 304 through the medium of the bevel gears 3055, 306 and 305. In this manner the totalizer reel 200, which is fast on a shaft 304, may be adjusted differentially to bring any one of the clerks' totalizers into coöperative relation with the totalizer driving gears 123.

When the crank is then given a slight counter clockwise rotation, it will cause a disengagement of the locking pawl 19 from the shoulder 24 of the gear 12. As hereinbefore described, such disengagement will result in a shifting of the pinion 41 out of the path of the pinion 43 and the crank 9 is then free to receive a clockwise rotation to operate the machine. (Figs. 2, 3, 4, 21 and 22.)

In order to indicate to the operator when the desired totalizer is in coöperative relation with the driving gears 123, an indicating dial 7 having a set of characters representing the clerks' totalizers is provided.

The shaft 307 which carries the bevel gear 306 also carries fixed thereto a gear 308 meshing with an intermediate gear 309 which in turn meshes with a gear 310, (Fig. 23) fixed to a stub shaft 311 which carries the indicator dial 7. By this gearing, the dial rotates in correspondence with the reel 200 bringing the proper totalizer indicating character 312 opposite a pointer 313 when a totalizer arrives opposite the pinions 123. In order to keep these characters or clerks' initials all in an upright position, so that all may be easily read in any setting of the dial, the gearing shown in Fig. 24 is provided.

Fast on the frame of the machine is a pinion 314 through the center of which passes the shaft 311. This pinion meshes with a plurality of intermediate pinions 315 (Fig. 24) which are arranged in a circle around the pinion 314 and are journaled on pins 316 carried by the dial 7. The intermediate pinions 315 mesh with pinions 317 which are arranged in a larger circle and are fast on pin 318 journaled in the dial 7 and carrying on their outer ends the small indicator disks. As the pinion 314 is fixed against rotation the pinions 315 will revolve around the pinion 314 upon the rotation of the dial 7 and will rotate in the same direction as the dial and will also make one rotation for each rotation of the dial. As the pinions 314, 315, and 317 are all the same size, the pinions 317 will rotate exactly the same number of degrees as the dial, but in the opposite direction. Therefore the characters 312, which are carried by disks fixed to the pinions 317, will always remain upright, regardless of the rotation of the dial.

After the reel 200 has been rotated to bring the desired clerk's totalizer opposite the pinions 123, a frame 373 which carries the reel is rocked rearwardly around its pivot 374, carrying the totalizer into mesh with the pinions 123. Such rocking movement is effected by a pitman 375 connecting the frame with a cam 376 on the shaft 15.

The transfer mechanism of the clerks' totalizers is shown in Figs. 25 and 26. In principle of operation it is similar to the transfer mechanism of the main totalizer 4. The clerks' totalizer pinions carry tripping cams 285 which when the pinions pass from "nine" to "zero" engage noses 286 of levers 287 and rock the same around their pivots 288. The levers 287 carry pins 289 which extend into notches of latch members 290 pivoted upon rod 291 and provided with shoulders 292 co-acting with shoulders 293 on toothed members 294. The teeth of members 294 are adapted to mesh with the pinions 123 and to actuate the same for the purpose of transferring at proper times. After the pinions 123 have been rotated the members 294 are slid into mesh therewith, bringing their shoulders 293 over the shoulders 292 of such of the latching members 290 as have not been rocked out of their paths by the actuation of their respective pawls 287. The pawls 287 and members 290 are arranged in pairs with the member 290 co-acting with the toothed member 294 of next higher order than the pinion of the totalizer which is in co-acting relation with the pawl 287. The members 294 are slid into and out of mesh with their respective pinions 123 by cams 295 carried by the shaft 14 and acting upon bell crank levers 296 which carry a rod 297 extending through slots 298 in the members 294. The slots 298 are curved concentric to the shaft 299 upon which the members 294 are slidably mounted so it is possible slightly to rock the members 294 around the shaft 299 independently of the rod 297. The shaft 18 is provided with a plurality of similar cams 352 which are so timed on the shaft that at the time of transferring they will rock levers 353 successively around the shaft 299 to carry transfer operating members 354 downwardly around the shaft 299 as a pivot. These operating members 354 are connected to the levers 353 by pins 355 which extend through slots in the members 354. There is one of these members 354 for each toothed member 294 and they are rocked downwardly in successive order, beginning with the lowest denominational order. The members 354 carry pins 356 which extend through slots 357 offset at 358 in the toothed members 294. Therefore if a transfer operating member 354 is in such position that its pin 356 is opposite the offset 358 at the time it is rocked downwardly, its companion toothed member 294 will not be rocked downwardly and will not effect a transfer. The members 354 are for this purpose slidable on the shaft 299 and also pivotally connected to the transfer pawls 287 by pins 359. When one of the transfer pawls 287 is tripped the operating slide 354 for such pawl will be moved rearwardly carrying its pin 356 into such position that upon the forward movement of its companion toothed member 294, the pin will be in the rearward end of the slot 357. Then when the member 354 is rocked downwardly it causes its companion toothed member to engage its respective pinion 123, rotating it one tooth space and thereby turning in the transfer. Such of the transfer pawls 287 as are not tripped hold their respective retaining levers 290 in such position that the shoulders 292 of the same will prevent accidental downward movement of respective toothed members 294. Each of the transfer pawls 287 is provided with a retaining pawl 360 which is normally held in the position in which it is shown in Fig. 26 by the hub of the totalizer pinion engaging the retaining pawl at its nose 361. The hub of the totalizer pinion is cut away at one point to permit the pawl to rock out of engagement with a pin 362 on the transfer pawl when the pinion passes from "nine" to "zero". Further rotation of the pinion causes the retaining pawl to be returned to its normal position, but as the transfer pawl has been tripped it will engage the pin 362 on the same at the shoulder 363 and will hold the transfer pawl in its tripped position until after the transfer has been effected.

After the transferring operation, the reel 200 is rocked away from the pinions 123 thus carrying the totalizer which had meshed with the pinions 123 clear of the transfer pawls 287. The transfer pawls are restored by cams 365, which are carried by the drive shaft 14 and act upon levers 366 which carry a rod 367 extending across the rear side of the shoulders 368 of the members 354. The cams serve to rock the levers 366 so that the rod 367 engages the shoulders 368 and returns the members 354 and through them at the pivotal connection 359 returns the transfer pawls but the clerk totalizer carrying frame 373 is now in its normal position with a bar 425 in engagement with tails of the retaining pawls 360 and because of this pawls 360 cannot rock clear of pins 362 upon the restoring of the transfer pawls. For this reason rod 288 upon which the transfer pawls are pivoted is carried by a frame 426 secured to shaft 291 which carries an arm 427 provided with a roller co-acting with a cam 428 on drive shaft 14. At the time of restoring the transfer pawls cam 428 rocks the arm 427 forwardly causing frame 426 to rock downwardly and carry the transfer pawls down with their pins 362 clear of pawls 360.

In order that the driving pinions 123 may be rotated the extra tooth space upon transferring operations independently of the sleeves 122 which are rigid with the gears of the main differential mechanism, the pinions 123 are connected to their respective tubes 122 by a set of broad pinions 369 meshing with the pinions 123 and similar companion pinions which are fixed to the tubes 122. The broad pinions are normally in mesh with the pinions 123 and their companion pinions and are moved out of mesh only at the time the carrying operation takes place, being carried by a frame 370 which is rocked at the proper time by cams 371 on drive shaft 14 to carry the pinions out of mesh. As the broad pinions move out of mesh they engage a rod 429 which serves to hold the pinions in alinement when out of mesh. All of the clerks' totalizer pinions are normally prevented from accidentally rotating by rods 377 which are carried by the reel and engage the teeth of the pinions. The rods extend through the reel a slight distance and such extensions come into the path of the slides 378 when their respective totalizers are brought opposite the pinions 123. The slides 378 move in a guide way in a non-rotating disk 379 and are operated by cams 380 carried by the shaft 15 and acting upon pitmen 381 which are pivoted at 382 to bell crank levers 383 which are pivoted to the frame 373 and carry the slides at their upper ends.

*Printing of clerks' totals.*—The mechanism for printing the totals of the clerks' totalizers may be next described. The reel 200 which carries the clerks' totalizers is first rotated to bring the clerk's totalizer 124, of which it is desired to print the total, opposite the set of pinions 201 (Figs. 36, 40, and 41). When totals are printed from the clerks' totalizers, the handle 1 is rotated to bring the indicator character which represents the totalizer of which it is desired to print a total, opposite a pointer 319. When the proper character is opposite this pointer, the corresponding totalizer will be opposite the pinions 201, connected to the total printing devices. Then one of the subtotal or total keys 46 or 47 is depressed rocking a frame 202 thereby meshing the pinions 201 with the selected clerk's totalizer.

If the subtotal key 46 is depressed a pin 203 which is carried by the key, engages a shoulder 204 of the frame 202 (Fig. 39) and rocks the frame rearwardly. A detent 205 (Fig. 38) then springs downwardly retaining the key in its depressed position and the frame 202 in its rear position with the pinions 201 meshing with the totalizer pinions. The shaft 206, upon which the pinions 201 are journaled, carries fast thereon a pinion 207 (Fig. 41) which meshes with a pinion 208 also carried by the frame 202. A segment gear 209 (Fig. 36) carried by a shaft 210 is arranged to mesh with the pinion 208. This shaft is provided with a crank 211 by which the shaft may be manually oscillated. The crank 211 is moved upwardly after the depression of one of the keys 46 or 47 causing the rotation of the pinion 208 and the pinion 207 and its shaft 206. The shaft 206 is provided with a groove 212, as indicated in Fig. 42, into which groove extend tongues 213 on disks 214 which are mounted upon the shaft. Therefore when the shaft 206 is rotated, the disks 214 will rotate with the shaft. The pinions 201 are not fixed to the shaft 206 but through frictional contact with the disks 214 will rotate as far as permitted by the totalizer pinions with which they mesh. The disks which are represented at 215 (Fig. 42) are merely spacing collars. When the pinions 201 are rotated upon the upward movement of the crank 211, the totalizer pinions with which they mesh rotate backwardly until the points of transfer cams 285, fixed to the totalizer pinions, engage a stop 217 carried by the frame 202 (Fig. 40). The shaft 210, upon which the operating handle 211 of the clerk's totalizer printing device is mounted, carries a cam 385 which actuates a bell crank lever 386, similar to the bell crank lever 383, and serving to operate slides 387 for the purpose of moving the rods 377 out of engagement with the clerks' totalizers when totals are printed. As the pinions 201 are not fixed to the shaft 206 this shaft may rotate farther than is necessary in order to reset the totalizer, but the continued rotation of the shaft insures that all of the pinions of the totalizer will be reset. The pinions 201 mesh with the gears 218 fixed to type wheels which are caused to rotate, upon the resetting of the totalizer, from their zero position to bring characters which correspond to the amount accumulated by the totalizer to the printing line. This is done through the pinions 201 which are compelled to rotate the same number of degrees as the totalizer pinions are rotated. The shaft 210 carries a cam 220 (Fig. 36) which, upon the upward movement of the crank 211, engages a roll 221 which is carried by a pitman 222 and draws the pitman downwardly. The pitman is pivoted to an arm 223 at its upper end, which arm carries a roll 224 which idly wipes by a wiper pawl 225 pivoted to the key detent 205, upon the downward movement of the pitman 222, but when the crank 211 is returned and as it nears its home position, the cam 220 lifts the pitman 222 causing the roll 224 to engage the pawl 225 and raise the detent 205 thereby releasing the key 46. A spring 226 then causes the frame 202 to follow the key forwardly thus carrying the pinions 201 out of mesh with the totalizer pinions. The return of the crank 211 and the segment 209 causes the pinions 208 and 201 to be backwardly rotated thereby returning the totalizer pinions to their original position.

It will be readily understood that the reverse movement of the gear segments 218 will cause the totalizer pinions 201 to resume the positions which they had before being returned to zero. The gear segments 218 are prevented from moving past their zero positions by any desired form of stop and thus when they reach their zero positions the totalizer pinions 201 will have been again placed in the positions which they previously had and the further movement of shaft 206 will not cause additional movement of either pinions 201 or the gear segments 218.

By depressing the total key 47 and then oscillating the crank 211, the total will be printed but the frame 202 will be permitted to rock forwardly carrying the pinions 201 out of mesh with the totalizer when the totalizer is in its reset position, thereby permitting the return of the gears 201, 208, and talizer is in its reset position, thereby permitting the return of the gears 201, 208, and 209 to their original positions without returning the totalizer pinions to their original positions. When the key 47 is depressed a pin 203 thereon does not directly engage the frame 202 but engages a shoulder 228 on a slide 229 mounted on the frame 202. The depression of this key will therefore also rock the frame 202 rearwardly but when the crank 211 nears its uppermost position, the roll 224, which is carried by the arm 223 (Fig. 36), engages a shoulder 230 on the slide 229 (Fig. 39) moving the slide downwardly out of contact with the pin 203 on the total key 47, thereby permitting the frame 202 to return to its initial position under the action of the spring 226. The pinions 201 will therefore be moved out of mesh with the totalizer pinions when the same are in their reset or zero position. Upon the return of the crank 211 the roll 224 engages the pawl 225 operating the detent 205 in the usual way and thereby releasing the key 47. As the key reaches its normal position the pin 203 clears the shoulder 228 of the slide 229 permitting the slide to return to its normal position under the action of its spring 231.

The clerks' totalizer printing mechanism is illustrated in Figs. 27 to 32 inclusive. The amount type wheels 246 are carried by concentric tubes 247 surrounding a rod 264 and to which are secured the gears 218 (Fig. 39). The type wheels therefore are set by the differential movement of these gears, as previously described. The paper upon which the totals are printed leads from a supply roll 248 between feed rolls 249 and 250, then between the type wheels and a platen 251, and out through a casing opening 252. The platen 251 is carried by arms 253 which are pivoted on pins 254 and are normally urged toward the type wheels by springs 255 but are held away from the type wheels by a cam 256 fast on shaft 210 which engages a spring pressed wiper pawl 257 on one of the arms 253. When the shaft 210 is rocked by the handle 211, as previously explained, the cam 256 first engages the wiper pawl 257, rocking the platen carrying arms downwardly against the action of the springs 255. At the proper time after the type-carriers are set, the point 258 of the cam clears the pawl 257 allowing the platen to spring upwardly and effect the impression. The wiper pawl permits an idle return of the cam 256.

The clerks' initial type-carrier 277 (Fig. 27) is differentially set by the handle 1 of the main crank 9. It receives movement from the gear 301 (Figs. 21 and 33) meshing with the intermediate gear 278 which meshes with a gear 2775 rigid with the type wheel. As the type wheel 277 rocks with the frame 202 it is necessary to provide means for preventing it from becoming disconnected from the gear 301. This is accomplished by mounting the gear 278 on an arm 279 which is pivoted to the frame of the machine by pin 280 and to the frame 265 by pin 281. When the frame 265 is rocked forwardly it causes the arm 279 to rock with it, but as gear 278 is mounted near the center of arm 279, it does not become entirely disconnected from either gears 301 or 2775. In Fig. 33 the frame 265 is shown in its rear position as it would be when the total of a clerk's totalizer is printed. Its normal position when the handle 1 is rotated is with the gears 301, 278, and 2775 partly disconnected.

The type-carriers 246 are provided with two sets of characters, one set 282 for printing and the other set 283, in view in Fig. 27, for reading. The cabinet of the machine is provided with a suitable sight opening to permit reading the type wheels at the point where the zero type are shown in Fig. 27.

The clerks' type carrier 277 is capable of receiving a full rotation in the adjustment of the totalizer reel 200. On the other hand the amount printing type carrier 246 is capable of receiving approximately one-third of a rotation. It is therefore necessary to construct the clerks' type carrier 277 somewhat different from the amount printing type carrier 246. By reference to Fig. 35 it will be noticed that the periphery of the type carrier 277 is provided with two style of type, one style being engraved to form a raised letter for the purpose of effecting the printing of the clerks' initials, while the other set of letters are merely stamped on the periphery of the wheel. The two sets of letters are duplicates as to number and form and are arranged alternately on the periphery of the type carrier. The like letters, however, are so arranged that when the printing type is at the printing line its corresponding reading type will be at the reading line.

A locking device is provided which is under the control of a Yale lock, or the like, not shown in the drawings, but by means of which a shaft 233 (Fig. 36) may be rocked about 180 degrees. The shaft 233 carries an eccentric disk 234 which fits in a circular opening 235 in a pitman 236. The pitman 236 at its upper end carries a roller 237 which extends across the upper edge of the key detent 205 and at its lower end is pivoted to a pawl 238 pivoted to frame 202 by pin 239 and co-acting with a notched disk 240 fixed to the shaft 210. Therefore, in order to rotate the shaft 210 it is necessary first to move the pitman upward by rocking the shaft 233. The upward movement of the pitman also carries roll 237 a sufficient distance above the detent 205 to permit the depression of one of the keys 46 or 47. The pitman is also connected to a pawl 241 by a link 242. This pawl is pivoted by pin 243 to the machine frame and when the pitman is raised the pawl is rocked into a notch 244 in a disk 245 which is fixed to the drive shaft 14. With the pawl 241 in the notch 244 it is impossible to operate the machine, and it is essential that operation of the machine be prevented when the printing device of the clerks' totalizers is being operated. Further, the full surface of the cam 245 prevents movement of pawl 241, during accounting operations of the machine, and therefore total printing is not possible except when the machine is in "home" or normal position.

In order to prevent the printing of zeros at the left of a total amount, the type-carriers of higher order are provided with disappearing zero type. The zero characters are carried by arms 270 which are pivoted to their respective type wheels by pins 271 and are urged by springs 272 upwardly so that the cipher will normally not be in a position to effect an impression. Each type-carrier is provided with a spacing hub 273 having a notch 274 to permit the zero type-carrier of the type wheel of next lower order to spring upwardly with its pin 275 in said notch when the first mentioned type wheel is in its zero position and each pin 275 extends over a shoulder 276 of the zero type-carrier of next lower order when the carriers are in normal position. By this construction, if a type-carrier of higher order is moved out of its zero position its hub 273 will engage the pin 275 of the zero type-carrier of next lower order and force the zero carrier into printing position, and this carrier through its engagement with the zero type-carrier of next lower order will force such carrier to the printing position and so on, thus causing a zero to be printed in orders lower than an operated type-carrier, but not in higher orders.

An endless ink ribbon 259 is carried by rolls 260 and 261 and is fed a slight distance upon each operation of the machine by a pawl 262 which is carried by the cam 256 and engages a ratchet 263 on the roll 261 upon the return stroke of the cam. The rod 264 which carries the concentric tubes 247 is journaled at one end in an arm 265 which forms a reinforcing member for the rocking frame 202. This arm carries a pin 266 extending through a slot in a lever 267 which is pivoted on a pin 268 and therefore causes this lever to be rocked each time the frame 202 is rocked. At its lower end the lever 267 carries a feed pawl 501 which upon the rocking of the lever engages a ratchet 269 fast to feed roller 249 and causes the feed of the paper.

*Controlling mechanism for the check printer.*—Details of the check and detail strip printer are not included in the drawings as this printer is similar in construction to the printer shown and described in the copending application No. 501235 before referred to. In Fig. 1 the supply roll of check paper is indicated by reference numeral 389 and the supply roll of detail paper by numeral 390. The platen for effecting impression on the detail paper causes it to be pressed against the upper side of the type wheels 120, and the platen for effecting the impressions on the check paper causes the check paper to be moved against the lower side of the type wheels. To permit impressions at two points the type wheels are provided with two sets of characters. The knife 391 severs the printed check from the remainder of the strip.

The present machine is so arranged that the check printing mechanism may be made inoperative. To this end a broad pinion 392 is provided, (Fig. 16) with means for rocking the same into and out of mesh with a gear 393 on the shaft 18 and a gear 394 on a shaft 395, in line with shaft 18 and carrying a cam which operates the check platen. Therefore if the broad pinion 392 is held out of mesh with the gears 393 and 394, the platen operating cam will not be actuated. The broad pinion 392 is carried by an arm 396 fixed to a shaft 397 which may be slightly rocked by an arm 398 also fixed to the shaft and provided with a slot 399 which is inclined with respect to the path of movement of a pin 400 carried by the "No check" key 44. By depressing the "No check" key, the arm 396 will be rocked forward causing the broad pinion 392 to be moved out of mesh. The shaft 18 carries a disk 401 having a notch 402 co-acting with a plate 403 fast on a slide 404 and permitting movement of the slide only when the shaft 18 is in its zero position. This slide must be moved inwardly whenever the "No check" key 44 is depressed as the rocking arm 398 engages a pin 405 on a lever 406 which is pivoted to the slide 404 by pin 407 and to the frame by pin 408. When the arm 398 is rocked upwardly upon the depression of the "No check" key 44 the point 409 of the arm engages the pin 405 rocking the lever 406 so as to push the slide 404 rearwardly causing the lug 403 to enter the notch 402. Because of this mechanism if the shaft 18 is not in its normal position it is impossible to depress the key 44. It is also impossible to release the "No check" key unless the shaft 18 is in its normal position as the point 409 of the arm 398 also engages the pin 405 upon its return. A spring 410 holds the arm 406 in engagement with the arm 398 and also urges the slide 404 to its normal position. When raised the pinions 392 engage a projection 516 on a plate 517, thus preventing disalinement of the pinions.

The machine is arranged so that each time a special transaction is recorded, that is, a trasaction other than one relating to a cash sale, a check is compelled to be issued. The bank of special keys (Fig. 19), besides having the usual key detent is provided with a special detent 411 for the key 44. The detent 411 is merely a spring actuated plate which co-acts with a notch 412 in the shank of the key 44 to hold the key in its depressed position. This detent is not actuated by the mechanism of the machine for releasing the keys at the end of an operation, being released only on the depression of one of the remaining keys in the special bank, with the exception of the totalizing key 45. Upon the depression of the "No check" key, when the notch 412 arrives opposite the plate 411 the plate is drawn upwardly into this notch by a spring 413. The plate is provided with shoulders 414 which co-act with the special keys 3 and when shoulder 415 enters the notch 412 the shoulders 414 will enter cut away parts 416 of the special keys. Thus when the "No check" key 44 is in its depressed position, and if then one of the special keys is depressed, the shank of the special key will engage one of the shoulders 414 camming the plate 411 downwardly and releasing the "No check" key.

*Clerk's indicator.*—The clerk's indicator 320 (Fig. 43) is set by the same mechanism which sets the clerk's reel 200 and the dial 7. The intermediate gear 301 (Figs. 21 and 43) meshes with a pinion 321 (Fig. 43) which meshes with a pinion 322 rigid with a gear 323 meshing with a gear 324. The gear 324 is fixed to a cam 325 provided with a spiral race into which extends a roll 326 on a lever 327 pivoted to the machine frame by pin 328 and to a beam 331 by a pin 330.

Rotation of the cam 325 causes the beam 331 to be rocked upwardly or downwardly around its pivot 332 with a link 333 thus causing one or two rolls 334 or 335 to be carried more or less into the path of one of two cams 336 or 337 on the drive shaft 15. The rolls 334 and 335 are carried by a slide 338 which is hung from the beam 331 by pin 339. The beam 331 is, of course, rocked upon the rotation of the handle 1 and the shaft 15 is not rotated until the crank 9 is rotated. When the shaft 15 rotates, one of the cams 336 or 337 engages the roll 334 or 335, which is in its path, returning the roll to its initial position thereby causing the beam 331 to rock around its pivot 330, an extent which equals the extent that the beam had previously been rocked from the pivot 332. As the cam 325 is at rest when the shaft 15 rotates it is impossible for the beam 331 to rock around its pivot 332 and as it rocks around its pivot 330 it either draws the link 333 downwardly or pushes the same upwardly thereby rocking the segment gear 340 which meshes with the pinion 341 of the clerk's indicator 320. As the indicator is rotated either forwardly or backwardly in correspondence with the rotation of the cam 325, the indicator will be set according to the setting of the clerk's totalizer reel. There are two indicators 320 carried by the shaft 342 but oppositely placed so that one will be suitable for reading from the front of the machine and the other from the rear of the machine.

Movement of link 333 is utilized for selecting cash drawers and for this purpose it has a pin 343 at its lower extremity which extends through a slot 344 in a segment gear 345 so disposed that the segment gear will be cammed either upwardly or downwardly according to the movement of the link 333. The segment gear 345 meshes with a pinion 347 which is rigid with a bevel gear 348 which meshes with a bevel gear 349 on an upright shaft 350. Therefore the shaft 350 will be differentially rotated in one direction or the other by the movement of the segment gear 345. The shaft 350 carries drawer latch operating arms such as are described in the Letters Patent of the United States to Wm. F. Bockhoff, No. 616,866, Dec. 27, 1898. The object of differentially rotating the shaft 350 is to bring one of these arms into operative relation with a certain drawer latch. After the shaft is differentially set it is moved upwardly to operate the drawer releasing mechanism by a lever 351 which is rocked at the proper time by a cam carried by the shaft 15 but not shown in the drawings. The shaft 350 is splined to the bevel gear 349 so that it can be moved in a longitudinal direction independently of the gear.

Fig. 45 (Sheet 7) shows a device for preventing the operation of the machine when one of the drawers is open. This locking device consists merely of spring pressed levers 419 which are permitted to move into the path of arms 417 fast on the drive shaft 18 when a drawer is moved to its open position. The shaft 18 comes to rest with the arm 417 in engagement with the shoulder 418 of the arm 419, thus preventing operation of the machine until the drawer is closed.

The main driving gear 13 carries a pin 29 which when the gear has made a little over one-half of a rotation engages an arm 30 of a bell hammer 31 tensioning a spring 32 for the bell hammer thus causing the hammer to strike a bell 33 when the pin 29 clears the arm 30. The hammer 31 is prevented from vibrating against the bell 33 by a spring pressed arm 34 which for this purpose co-acts with a pin 35 on the bell hammer.

While the form of mechanism herein shown and described is admirably adapted to fulfil the objects primarily stated it is to be understood that it is not intended to confine the invention to the one form of embodiment herein shown and described as it is suceptible of embodiment in various forms all coming within the scope of the claims which follow.

What is claimed is:

1. In a machine of the class described, the combination with a rotatable carrier, and a series of totalizers carried thereon, of operating devices for said totalizers, a main driving crank having a handle thereon, connections from said crank to actuate said totalizer operating devices, and independent connections from said handle to rotate said totalizer carrier.

2. In a machine of the class described, the combination with a plurality of totalizers and a rotatable carrier on which said totalizers are mounted, of a set of actuating devices common to said totalizers, a crank and a handle thereon, connections from said crank to actuate said operating devices, and gearing separate from said connections connected to said handle when the same is in normal position, with connections from said gearing to said totalizer carrier.

3. In a machine of the class described, the combination with a plurality of totalizers and a carrier for the same, of operating devices common to all said totalizers, connections for moving said carrier to bring any of the totalizers thereon into operative relation with said operating devices, a main driving device having connections to actuate said totalizer operating devices, and gearing connecting an element of said driving device, only when the same is in normal position, to said totalizer carrier.

4. In a machine of the class described, the combination with a plurality of totalizers, and a carrier on which said totalizers are mounted, of operating devices common to said totalizers, and into operative relation with which any desired totalizer may be placed, a main driving crank and a handle carried thereby, connections actuated by rotation of said handle independently of said crank for differentially adjusting said totalizer carrier, and connections actuated by rotation of said crank for actuating said totalizer operating devices.

5. In a machine of the class described, the combination with a plurality of totalizers and a rotatable carrier on which said totalizers are mounted, of operating devices common to said totalizers and into operative relation with which any totalizer may be placed, a main driving device having connections to actuate said operating devices, gearing connecting an element of said driving device to said rotatable carrier, when said driving device is in normal position, and devices actuated by a backward movement of said driving device and constructed to disable the gearing connecting said rotatable carrier to the said element of the driving device.

6. In a machine of the class described, the combination with a plurality of totalizers and a movable carrier on which said totalizers are mounted, of operating devices common to said totalizers, a main driving device including a handle, connections from said driving device to actuate said totalizer operating devices, a gear carried by said handle, setting devices for said carrier including a gear normally meshing with said handle gear, and devices actuated by a backward movement of said driving device, and constructed to move said setting device gear axially out of line with said handle gear.

7. In a machine of the class described, the combination with a plurality of totalizers, and a movable carrier on which said totalizers are mounted, of operating devices common to said totalizers, a main driving device including a handle, connections from said driving device to said totalizer actuators, gear connections whereby said handle may adjust said totalizer carrier differentially, controlling devices for enabling and disabling said gear connections, and means for actuating said controlling devices by the final movement of said driving device.

8. In a machine of the class described, the combination with a rotatable carrier and a plurality of totalizers mounted thereon, of an indicator comprising a rotatable device such as a plate, and a plurality of tablets rotatably mounted on said plate, a stationary device having continuous connections to said tablets, gearing connecting said rotatable carrier and said indicating plate, and a handle for driving said gearing.

9. In a machine of the class described, the combination with a bank of keys, and a pivoted lever arm differentially adjusted by said keys, of a pivoted rack segment having a slot and pin connection to said lever arm, a bar to which said rack segment is pivoted, means for elevating said bar, and a gear engaged by said segment when the said bar is elevated.

10. In a machine of the class described, the combination with a bank of keys, and a lever arm differentially adjusted by said keys, of a rack segment having a sliding connection to said lever arm, a bar to which said segment is pivoted, means for rocking said bar, a gear engaged by said segment, and means for restoring said rack segment to normal position.

11. In a machine of the class described, the combination with a bank of keys, and a lever arm differentially adjustable thereby, of a rack segment having a sliding connection to said lever arm, a movable bar to which said segment is pivoted, means for moving said bar, a gear to which said segment is connected by movement of said bar, and a key having connections to disconnect said bar moving means.

12. In a machine of the class described, the combination with a bank of keys, of a rack segment differentially adjusted thereby, a bar to which said segment is pivoted, means for moving said bar, a gear to which said segment is connected by movement of said bar, and a total key having connections to disable said bar moving means.

13. In a machine of the class described, the combination with a plurality of type carriers, and gears connected thereto, of a shaft on which said gears are frictionally mounted, totalizer elements with which said gears may be manually connected, means for rotating said shaft, and a platen for taking impressions from said type carriers.

14. In a machine of the class described, the combination with a plurality of type carriers, and gears continuously connected thereto, of a shaft on which said gears are frictionally mounted, means for giving said shaft rotations of invariable extent, totalizer elements with which said gears may be engaged, and a platen for taking impressions from said type carriers, with connections from said shaft rotating means to operate said platen.

15. In a machine of the class described, the combination with a swinging frame; of a plurality of type carriers, gears connected thereto, and a shaft on which said gears are frictionally mounted, all carried by said frame; totalizer elements, a key having connections to swing said frame and thereby connect said gears to said totalizer elements, means for rotating said shaft, and a platen for taking impressions from said type carriers.

16. In a machine of the class described, the combination with a plurality of number bearing elements, and gear elements connected thereto, of a shaft on which said gear elements are frictionally mounted, totalizer elements to which said gear elements may be connected, and means for giving said shaft rotations of invariable extent.

17. In a machine of the class described, the combination with a plurality of number bearing elements, and gear elements connected thereto, of a shaft on which said gear elements are frictionally mounted, totalizer elements, a key having connections to engage said totalizer elements and said gear elements, and means for giving said shaft rotations of invariable extent.

18. In a machine of the class described, the combination with a plurality of number bearing elements, and gear elements connected thereto, of a shaft on which said gear elements are frictionally mounted, totalizer elements, a key having connections to engage said totalizer elements and said gear elements, a key controlled lock normally preventing actuation of said key, and means for giving said shaft rotations of invariable extent.

19. In a machine of the class described, the combination with type carriers, and a group of totalizer elements, of frictionally driven devices connecting said totalizer elements and said type carriers, and means for taking impressions from said type carriers.

20. In a machine of the class described, the combination with type carriers, and a group of totalizer elements, of gear connections between said totalizer elements and said type carriers, means for frictionally driving said gear connections, and a platen for taking impressions from said type carriers.

21. In a machine of the class described, the combination with type carriers, and a group of totalizer elements, of positive connections between said type carriers and said totalizer elements, means for frictionally driving said connections, a platen for taking impressions from said type carriers, and a handle having connections to actuate both said frictional driving means and said platen.

22. In a machine of the class described, the combination with type carriers, and a group of totalizer elements, of devices for positively connecting said type carriers and said totalizer elements, means for frictionally driving said connecting devices, and a platen for taking impressions from said type carriers, and total and sub-total keys each connected to move said connecting devices to connecting position.

23. In a machine of the class described, the combination with a rotatable carrier and a plurality of totalizers carried thereby, of a group of type carriers, gears continuously connected to said type carriers, means for bringing any one of said totalizers into connection with said gears, devices for frictionally driving said gears, and a platen for taking impressions from said type carriers.

24. In a machine of the class described, the combination with a plurality of totalizers, and a movable frame on which said totalizers are carried, of a group of type carriers, gears connected to said type carriers with means for frictionally driving said gears, devices for shifting said totalizer frame to bring any desired totalizer into connection with said gears and a platen for taking impressions from said type carriers.

25. In a machine of the class described, the combination with a plurality of totalizers, and a rotatable carrier therefor, of a non-rotative disk mounted coaxially with said carriers and having a notch therein, bars carried by said totalizer carrier and positioned normally to engage said disk and said totalizers and thereby prevent actuation of said totalizers, and means for moving into said notch the bar which has been alined therewith by movement of the totalizer carrier.

26. In a machine of the class described, the combination with a movable carrier, and a plurality of totalizers mounted thereon, of actuating devices into alinement with which any of said totalizers may be placed by movement of said totalizer carrier, a stationary plate confronting all said totalizers and having a notch therein opposite said actuating devices, bars normally engaging said totalizers and riding on the edge of said plate, thereby preventing movement of said totalizers, and means for moving into said notch the bar which has been alined therewith by movement of said totalizer carrier.

27. In a machine of the class described, the combination with a plurality of totalizers, of operating devices common to all of said totalizers, and a main operating device having a member adapted to establish a coöperative relation between the totalizer operating devices and any one of said totalizers independent of any movement of said main operating device.

28. In a machine of the class described, the combination with a plurality of totalizers, of operating devices common to all of said totalizers, and a main operating device and means carried thereby for predetermining which of said totalizers will be operated upon an operation of the main operating device.

29. In a registering device, the combination with a plurality of totalizers, means common to all of said totalizers for resetting them to zero, and a main operating device having a member for establishing a coöperative relation between the resetting means and any of said totalizers independent of any operation of the main operating device.

30. In a registering device, the combination with a plurality of totalizers, means common to all of said totalizers for resetting them to zero, a main operating device and means carried thereby for establishing a coöperative relation between the resetting means and any one of said totalizers independent of any operation of the main operating device.

31. In a machine of the class described, the combination with a plurality of accounting devices, of operating mechanism adapted to effect accounting operations in the accounting devices, mechanism for selectively effecting an operative relation between any one of the accounting devices and said operating mechanism, and an operating handle having connections to drive said operating mechanism and independent connections to drive said selecting mechanism.

32. In a machine of the class described, the combination with a plurality of accounting devices, of operating mechanism for effecting accounting operations in said devices, mechanism for selectively effecting an operative relation between any one of the accounting devices and said operating mechanism, and a crank and a handle thereon having connections whereby rotation of the handle operates said selecting mechanism while rotation of the crank operates said operating mechanism.

33. In a machine of the class described, the combination with accounting devices, of operating mechanism therefor, and a crank and a handle having connections whereby rotation of the handle selectively effects an operative relation between any one of the accounting devices and the operating mechanism, and rotation of the crank in one direction effects operation of said operating mechanism while its rotation in the opposite direction destroys the operative relation between said handle and the accounting devices.

34. In a machine of the class described, the combination with a plurality of accounting devices, of differential mechanism for operating the accounting devices, selecting mechanism adapted to bring any desired accounting device and the differential mechanism into operative relation, and a manually operated driving member so constructed that by separate movements it may operate said selecting mechanism and said differential mechanism.

35. In a machine of the class described, the combination with a differential mechanism, of a totalizer operated thereby and comprising a plurality of denominational elements, carrying devices for said totalizer elements, and trips for controlling the operation of said carrying devices constructed so to coöperate with the denominational elements as to permit operation of said trips only when the said elements are passing from "nine" to "zero" positions.

36. In a machine of the class described, the combination with sales recording mechanism, of a check issuing device, means for making said device inoperative, a manipulative device for controlling said means, and separate manipulative devices constructed to control said sales recording mechanism and having connections to restore said first mentioned manipulative device to normal position if displaced.

37. In a machine of the class described, the combination with accounting mechanism and normally latched cash drawers, of operating mechanism having connections for releasing said cash drawers, cash drawer selecting mechanism driven by said operating mechanism directly from position for selecting one drawer to a position for selecting another, and manipulative devices adapted to control the drawer selecting mechanism.

38. In a machine of the class described, the combination with accounting mechanism, of transfer devices adapted to be tripped by impact from said accounting mechanism, and cams rigid with said accounting mechanism and coöperating with said transfer devices to restore the same on a backward movement of the accounting mechanism.

39. In a machine of the class described, the combination with a plurality of totalizers, and operating mechanism for causing said totalizers to accumulate amounts, printing mechanism, devices, independent of said operating mechanism, adapted to be connected with any totalizer, and total printing type carriers driven by said independent devices.

40. In a machine of the class described, the combination with a movable frame, of a plurality of totalizers carried thereby, a set of actuators common to all of said totalizers, means for moving the totalizer frame to bring any desired totalizer into operative relation to said actuators, an indicator comprising a rotatable plate, a plurality of tablets rotatably mounted on said plate, and means whereby movement of the totalizer frame will cause rotation of the plate and the tablets about their respective centers.

41. In a machine of the class described, the combination with a movable frame, of a plurality of totalizers carried thereby, means for moving said frame, an indicator comprising a rotatable element, a plurality of tablets rotatably mounted on said element, and devices whereby operation of the aforesaid moving means will cause rotation of said tablets.

42. In a machine of the class described, the combination with a plurality of accounting devices and normally latched cash drawers, of operating mechanism having connections for releasing said cash drawers, cash drawer selecting mechanism driven by the operating mechanism directly from position for selecting one drawer to position for selecting another and manipulative means for selecting the accounting device to be operated and predetermining the position to which the drawer selecting mechanism is to be driven by subsequent operation of the operating mechanism.

43. In a machine of the class described, the combination with a plurality of totalizers, of a set of actuators common to said totalizers, a plurality of normally latched cash drawers, operating mechanism for said actuators having connections for releasing said cash drawers, drawer selecting mechanism driven by the operating mechanism directly from position for selecting one drawer to position for selecting another, and a manipulative device operable to move any desired totalizer in operative relation to the actuators and predetermine the position to which the drawer selecting mechanism is to be driven.

44. In a machine of the class described, the combination with a plurality of totalizers, of a set of actuators common to said totalizers, means for bringing any desired totalizer into operative relation to the actuators, a plurality of normally latched receptacles, operating mechanism for said actuators having connections for latching said receptacles, selecting mechanism for the receptacles driven directly from position for selecting one receptacle to position for selecting another, and means whereby moving a totalizer into operative relation to the actuators predetermines the position to which the said selecting mechanism is to be driven by operation of the operating mechanism.

45. In a machine of the class described, the combination with a plurality of accounting devices, of operating mechanism adapted to effect accounting operations of the accounting devices, mechanism for selectively effecting an operative relation between any one of the accounting devices and said operating mechanism, and an operating handle having connections to independently drive either said operating mechanism or said selecting mechanism.

46. In a machine of the class described, keys of different classes, a key of one class being normally arrestable when depressed, and means controlled by a key of the other class for rendering the first mentioned key non-arrestable.

47. In a machine of the class described, keys of different classes, means for arresting a key of one class when depressed, said means being controlled by a key of the other class whereby said arresting means is rendered ineffective when the key of the other class is depressed.

48. In a machine of the class described, keys of different classes, means for arresting keys of only one class, said means being disabled upon the depression of a key in the other class.

49. In a machine of the class described, keys of different classes and locking means for a key of one class normally in effective condition whereby said key normally will be depressible and arrestable, said locking means being controlled by the depression of a key of the other class whereby said first mentioned key will be non-arrestable when depressed.

In testimony whereof I affix my signature in the presence of two witnesses.

THOMAS CARROLL.

Witnesses:
R. C. GLASS,
CARL W. BEUST.